United States Patent
Momchilov et al.

(10) Patent No.: US 11,627,091 B2
(45) Date of Patent: Apr. 11, 2023

(54) SYSTEMS AND METHODS FOR MANAGING STREAMS OF PACKETS VIA INTERMEDIARY DEVICES

(71) Applicant: Citrix Systems, Inc., Fort Lauderdale, FL (US)

(72) Inventors: Georgy Momchilov, Parkland, FL (US); Derek Thorslund, San Jose, CA (US); Daljit Singh, San Jose, CA (US); Vladimir Vysotsky, Fremont, CA (US)

(73) Assignee: CITRIX SYSTEMS INC., Washington, DC (US)

( * ) Notice: Subject to any disclaimer, the term of this patent is extended or adjusted under 35 U.S.C. 154(b) by 163 days.

(21) Appl. No.: 16/588,638

(22) Filed: Sep. 30, 2019

(65) Prior Publication Data

US 2020/0374238 A1 Nov. 26, 2020

Related U.S. Application Data

(63) Continuation of application No. 16/588,280, filed on Sep. 30, 2019, now Pat. No. 11,489,779.
(Continued)

(51) Int. Cl.
*H04L 12/911* (2013.01)
*H04L 47/2441* (2022.01)
(Continued)

(52) U.S. Cl.
CPC ...... *H04L 47/2441* (2013.01); *H04L 47/2458* (2013.01); *H04L 47/2475* (2013.01);
(Continued)

(58) Field of Classification Search
None
See application file for complete search history.

(56) References Cited

U.S. PATENT DOCUMENTS 6,967,954 B2 11/2005 Sugiyama
7,653,749 B2 1/2010 Coleman et al.
(Continued)

OTHER PUBLICATIONS

Citrix Support Knowledge Center, Citrix ICA Virtual Channels Overview, Jan. 4, 2017, Retrieved via URL: https://support.citrix.com/article/CTX 116890 (Year: 2017).
(Continued)

*Primary Examiner* — Ajit Patel
*Assistant Examiner* — Pamit Kaur
(74) *Attorney, Agent, or Firm* — Foley & Lardner LLP

(57) ABSTRACT

Virtual application and desktop delivery may be optimized by supplying application metadata and user intent to the device between a client and a server hosting resources for the delivery. The data packets used to deliver the virtual application or desktop may be also tagged with references to the application. By supplying the metadata and tagging packets with the metadata, an intermediary network device may provide streams of data packets at the target QoS. In addition, the device may apply network resource allocation rules (e.g., firewalls and QoS configuration) for redirected content retrieved by the client out of band relative to a virtual channel such as the Internet. The network resource allocation rules may differ for different types of resources accessed. The device may also control a delivery agent on the server to modify communication sessions established through the virtual channels based on network conditions.

16 Claims, 19 Drawing Sheets

Related U.S. Application Data

(60) Provisional application No. 62/850,348, filed on May 20, 2019.

(51) Int. Cl.
| | |
|---|---|
| *H04L 47/78* | (2022.01) |
| *H04L 47/80* | (2022.01) |
| *H04L 47/2475* | (2022.01) |
| *H04L 47/74* | (2022.01) |
| *H04L 47/76* | (2022.01) |
| *H04L 47/70* | (2022.01) |
| *H04L 47/24* | (2022.01) |
| *H04L 47/31* | (2022.01) |
| *H04L 69/22* | (2022.01) |
| *H04L 9/40* | (2022.01) |

(52) U.S. Cl.
CPC ............ *H04L 47/31* (2013.01); *H04L 47/746* (2013.01); *H04L 47/76* (2013.01); *H04L 47/781* (2013.01); *H04L 47/805* (2013.01); *H04L 47/822* (2013.01); *H04L 69/22* (2013.01); *H04L 63/166* (2013.01)

(56) References Cited

U.S. PATENT DOCUMENTS

| | | | |
|---|---|---|---|
| 8,577,937 | B1 | 11/2013 | Offer |
| 8,780,898 | B2 | 7/2014 | Moriarty et al. |
| 8,788,822 | B1 | 7/2014 | Riddle |
| 9,723,091 | B1 | 8/2017 | Krock et al. |
| 9,813,341 | B1 | 11/2017 | Tailor et al. |
| 10,025,304 | B1 | 7/2018 | Stubbs et al. |
| 10,250,673 | B1 | 4/2019 | Brooker et al. |
| 2002/0073061 | A1* | 6/2002 | Collins ............... H04L 67/2828 |
| 2006/0039350 | A1* | 2/2006 | Sturrock ............... H04L 1/1678 370/351 |
| 2006/0059107 | A1 | 3/2006 | Elmore et al. |
| 2006/0195881 | A1 | 8/2006 | Segev et al. |
| 2007/0046980 | A1 | 3/2007 | Coleman et al. |
| 2008/0285578 | A1 | 11/2008 | Delay et al. |
| 2009/0037998 | A1 | 2/2009 | Adhya et al. |
| 2009/0165066 | A1 | 6/2009 | Brouda |
| 2011/0276699 | A1 | 11/2011 | Pedersen |
| 2011/0276993 | A1 | 11/2011 | Ferguson |
| 2012/0226742 | A1 | 9/2012 | Momchilov et al. |
| 2015/0003247 | A1 | 1/2015 | Mejia et al. |
| 2015/0128110 | A1 | 5/2015 | Falk et al. |
| 2015/0200845 | A1 | 7/2015 | Roskind |
| 2016/0105727 | A1 | 4/2016 | Yim et al. |
| 2016/0173811 | A1 | 6/2016 | Oh et al. |
| 2016/0234216 | A1 | 8/2016 | Fausak et al. |
| 2016/0345347 | A1 | 11/2016 | Cheng et al. |
| 2016/0380860 | A1 | 12/2016 | Singhal |
| 2017/0026980 | A1* | 1/2017 | Krishna ............... H04L 47/722 |
| 2017/0078406 | A1 | 3/2017 | Ruge |
| 2017/0149738 | A1 | 5/2017 | Zheng et al. |
| 2017/0230853 | A1 | 8/2017 | Wright et al. |
| 2017/0317932 | A1* | 11/2017 | Paramasivam ....... G06F 9/5083 |
| 2017/0353372 | A1 | 12/2017 | Suzuki et al. |
| 2018/0083850 | A1 | 3/2018 | Rabipour et al. |
| 2018/0091483 | A1 | 3/2018 | Eiriksson et al. |
| 2018/0167420 | A1 | 6/2018 | Shukla et al. |
| 2019/0215254 | A1 | 7/2019 | Yoshida |
| 2019/0268921 | A1* | 8/2019 | Jiang ..................... H04L 1/0004 |
| 2020/0313970 | A1* | 10/2020 | Almasmoum ........ H04L 47/748 |
| 2020/0412833 | A1 | 12/2020 | Yang et al. |

OTHER PUBLICATIONS

Non-Final Office Action on U.S. Appl. No. 16/588,280 dated Mar. 8, 2021.
Non-Final Office Action on U.S. Appl. No. 16/684,244 dated Feb. 17, 2021.
Non-Final Office Action on U.S. Appl. No. 16/684,298 dated Mar. 4, 2021.
International Search Report and Written Opinion on PCT Appl No. PCT/US2020/033546 dated Dec. 9, 2020.
Partial International Search Report on PCT Appl. No. PCT/US2020/033546 dated Oct. 7, 2020.
Final Office Action on U.S. Appl. No. 16/588,616 dated Dec. 10, 2021.
International Preliminary Report on Patentability on PCT Appl. No. PCT/US2020/033546 dated Dec. 2, 2021.
Non-Final Office Action on U.S. Appl. No. 16/588,280 dated Dec. 29, 2021.
Notice of Allowance on U.S. Appl. No. 16/684,244 dated Nov. 1, 2021.
Notice of Allowance on U.S. Appl. No. 16/684,298 dated Dec. 13, 2021.
Advisory Action on U.S. Appl. No. 16/684,244, dated Sep. 14, 2021.
Final Office Action on U.S. Appl. No. 16/588,280 dated Aug. 3, 2021.
Final Office Action on U.S. Appl. No. 16/684,298 dated Aug. 31, 2021.
Final Office Action on U.S. Appl. No. 16/684,342 dated Aug. 23, 2021.
Non-Final Office Action on U.S. Appl. No. 16/588,616 dated Jun. 1, 2021.
Non-Final Office Action on U.S. Appl. No. 16/684,244 dated Jul. 2, 2021.
Non-Final Office Action on U.S. Appl. No. 16/684,288 dated May 13, 2021.
Non-Final Office Action on U.S. Appl. No. 16/684,342 dated May 5, 2021.
Notice of Allowance on U.S. Appl. No. 16/684,288 dated Sep. 8, 2021.
Non-Final Office Action on U.S. Appl. No. 16/588,616 dated Apr. 13, 2022.
Non-Final Office Action on U.S. Appl. No. 16/684,342 dated Feb. 10, 2022.
Final Office Action on U.S. Appl. No. 16/684,342 dated Jun. 3, 2022.
Non-Final Office Action on U.S. Appl. No. 17/536,587 dated Sep. 23, 2022.
Notice of Allowance on U.S. Appl. No. 16/588,280 dated Jul. 20, 2022.

* cited by examiner

SYSTEMS AND METHODS FOR MANAGING STREAMS OF PACKETS VIA INTERMEDIARY DEVICES

CROSS-REFERENCES TO RELATED APPLICATIONS

The present application claims priority under 35 U.S.C. § 120 as a continuation of U.S. patent application Ser. No. 16/588,280, titled "SYSTEMS AND METHODS FOR MANAGING STREAMS OF PACKETS VIA INTERMEDIARY DEVICES," filed Sep. 30, 2019, which claims priority under 35 U.S.C. § 119(e) to U.S. Provisional Patent Application No. 62/850,348, titled "OPTIMZING VIRTUAL APPLICATION DELIVERY USING APPLICATION METADATA," filed May 20, 2019, each of which is incorporated herein by reference in their entirety.

FIELD OF THE DISCLOSURE

The present application generally relates to communication and networking systems, including but not limited to systems and methods for delivering virtual applications and desktops.

BACKGROUND

In a network computing environment, a communication channel may be used to exchange data packets among network devices.

BRIEF SUMMARY

This summary is provided to introduce a selection of concepts in a simplified form that are further described below in the Detailed Description. This summary is not intended to identify key features or essential features, nor is it intended to limit the scope of the claims included herewith.

An intermediary network device may reside between clients and servers, and may control access by a client to resources hosted on one of the servers. One example of the intermediary network device may be of a software defined wide-area network (SD-WAN). The intermediary network device may support communications in accordance with multi-stream remote access protocols, such as Independent Computing Architecture (ICA), High-Definition User Experience (HDX) display remoting protocols, and Remote Desktop Protocol (RDP). With multi-stream remote access, the intermediary network device may control quality of service (QoS) (e.g., a range for packet loss, bit rate, throughput, delay, and jitter) for different virtual channels and may have separate ports for delivery of various resources. The intermediary network device may also perform other functions in connection with the communications, such as data compression and caching.

To better utilize the capabilities of the intermediary network device, the virtual application and desktop delivery may be optimized by supplying rich application metadata and user intent (also in the form of metadata) to the intermediary network device between a client and a server hosting resources for the delivery. The application metadata may include various information regarding the operation of the application, such as an application name, type, and user element in focus, among others. The user intent can be deduced by interactions that are detected and/or anticipated (e.g., scrolling, typing, the type of controls, etc.). The data packets and/or virtual channels used to deliver the virtual application or desktop may be also identified (e.g., tagged) with references to the application. The metadata (associated with the application and/or the user intent) may be sent separate from the data packets in a different virtual channel. By supplying the metadata and tagging packets or virtual channels with the metadata, the intermediary network device may control the quality of service (QoS) independent of the processing of the data packets, and provide streams of data packets at the target QoS.

In addition, the intermediary network device may apply network resource allocation rules (e.g., firewall and/or QoS configuration) for redirected content out of band relative to or otherwise not included in a virtual channel (e.g., the Internet) and retrieved by the client. The network resource allocation rules may differ for different types of resources accessed. For example, a different QoS may be specified for multi-stream remote access using virtual channels and for general Internet browsing. Under these rules, the user may not be allowed to watch video streaming from the host website directly (e.g., without using the virtual channels), but may be redirected to one of the virtual channels to access the video streaming. The rules may allow for different acceleration techniques, such as Browser Content Redirection (BCR), Multimedia Redirection with client-side fetching, and Flash redirection, among others, to allow for fine controlling of network resources in communicating data packets. The intermediary network device may also instruct, or control a virtual delivery agent (VDA) on the server to modify communication sessions established through the virtual channels based on network conditions. In this manner, network resources may be allocated in accordance with the network conditions.

At least one aspect is directed to systems, methods, and non-transitory computer readable media of managing streams of packets. A network device intermediary between a client device and a server may receive, from a delivery agent, metadata of an application hosted on the server and accessible by the client device. The metadata may include data indicative of user interaction with the application. The network device may support a plurality of virtual channels of the application to communicate at least one stream of packets. The network device may receive, from the delivery agent, the at least one stream of packets. The at least one stream of packets may include an identifier associated with a portion of the metadata. The network device may determine network resources to allocate to the at least one the stream of packets, according to the portions of the metadata associated with the at least one stream of packets.

In some embodiments, the metadata may include an identification of the application. In some embodiments, the interaction data may include information on at least one of: an activated user interface element, an event notification, user input through an input device, or a uniform resource locator (URL) accessed by a user.

In some embodiments, the network device may receive, from the delivery agent, the metadata of the application via a virtual channel separate from the plurality of virtual channels. In some embodiments, the network device may send, to the client device, the metadata of the application. In some embodiments, the network device may receive, from the client device, second streams of packets. Each of the second streams of packets may include the identifier associated with a portion of the metadata. In some embodiments, the network device may determine network resources to allocate to at least one of the second streams of packets, according to the portions of the metadata associated with the second streams of packets.

In some embodiments, the network device may receive, from the client device, second metadata about activity at the client device. In some embodiments, the network device may receive, from the client device, second streams of packets. Each of the second streams of packets may include a second identifier associated with a portion of the second metadata. In some embodiments, the network device may determine network resources to allocate to at least one of the second streams of packets, according to the portions of the second metadata associated with the second streams of packets.

In some embodiments, the network device may receive, from the delivery agent, the metadata of the application via a cloud service or another network device. In some embodiments, the network device may access, from a packet header, the identifier associated with a portion of the metadata. In some embodiments, the packet header may include a transport layer security (TLS) or datagram TLS (DTLS) header with a clear-text extension.

In some embodiments, the network device may apply at least one policy on the portions of the metadata associated with the streams of packets. In some embodiments, the network device may determine, based on application of the at least one policy, the channel resources to allocate to the at least one of the streams of packets. In some embodiments, the network device may provide a desired quality of service (QoS) to the at least one of the streams of packets, by allocating the determined network resources to the at least one of the streams of packets. In some embodiments, the network device may allocate the determined network resources to the at least one of the streams of packets by allocating a bandwidth, setting a bandwidth limit, or throttling a data transmission rate for the at least one of the streams of packets.

At least one aspect is directed to systems, methods, and non-transitory computer readable media of accessing web content. A network device intermediary between a client device and a server may receive, from a delivery agent, metadata of an application hosted on the server and accessible by the client device. The network device may receive, from the delivery agent, an identifier (e.g., a uniform resource locator (URL)). The URL may enable the client device to access web content from a web server. The network device may determine, according to the received metadata, an allocation of network resources to access the web content from the web server. The network device may provide network resources to the client device to access the web content via the network device based on the determined allocation of network resources.

In some embodiments, the metadata may include at least one of: an identification of the application, or interaction data indicative of user interaction with the application. In some embodiments, the network device may receive updated metadata from the delivery agent that includes the URL. In some embodiments, the network device may support at least one virtual channel of the application. Each virtual channel may be for communicating a corresponding stream of packets. In some embodiments, a URL-redirection request including the URL may be transmitted via a first virtual channel of the at least one virtual channel, from the delivery agent to the client device. The URL-redirection request may cause the client device to access the web content from the web server.

In some embodiments, the network device may determine, according to the received metadata, at least one rule for allocating network resources for accessing the web content from the web server. In some embodiments, the at least one rule for allocating network resources for accessing the web content from the web server may include at least one of: a firewall rule or a quality-of-service (QoS) rule. In some embodiments, the network device may apply the at least one rule for allocating network resources for the client device to access the web content via the network device.

In some embodiments, the network device may receive the metadata of the application via a virtual channel separate from the at least one virtual channel, or via a cloud service or another network device. In some embodiments, the network device may cause the web content and data of the application to be rendered at the client device. In some embodiments, the network device may cause the web content to be integrated with the data of the application for rendering at the client device.

In some embodiments, the network device may receive, from a workspace application of the client device, metadata about activity at the client device. In some embodiments, the network device may determine, according to the metadata of the application and the metadata about activity at the client device, the allocation of network resources for accessing the web content from the web server.

At least one aspect is directed to systems, methods, and non-transitory computer readable media of managing streams of protocol packets. A network device intermediary between a client device and a server may determine network conditions. The network device may be supportive of a plurality of virtual channels between the client device and an application executable on a delivery agent of the server. The virtual channels may communicate streams of packets. The network device may transmit, to the delivery agent, metadata indicative of the determined network conditions. The delivery agent may update, in response to the transmitted metadata indicative of the determined network conditions, a packet transmission configuration of the virtual channels.

In some embodiments, the network device may change a packet transmission mode of at least one of the virtual channels, from a first mode to a second mode that is more bandwidth efficient than the first mode. In some embodiments, the network device may change one of the virtual channels from a H.264 graphics mode to a Thinwire+ graphics mode.

In some embodiments, the network device may change an allocation of network resources to apply to the virtual channels. In some embodiments, the network condition may include a reduction in bandwidth to the virtual channels. The network device may disable a first virtual channel from the plurality of virtual channels. In certain embodiments, the network condition comprises an increase in at least one of latency or packet loss to the virtual channels, and the network device may update the packet transmission configuration by changing at least one of the virtual channels from a first transmission mode to a second transmission mode that is more lossy (or less reliable) than the first transmission mode. This may be advantageous to the interactivity of user experience (UX), e.g., graphics and user input into the virtual session.

In some embodiments, the first channel is selected from a list or priority-related order of virtual channels to disable. In some embodiments, the network device may apply a bandwidth cap to at least one of the virtual channels. In some embodiments, the network condition may include a link failure. The network device may disable a first virtual channel from the plurality of virtual channels or reduce an allocation of bandwidth to the first virtual channel.

BRIEF DESCRIPTION OF THE DRAWINGS

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 1A:
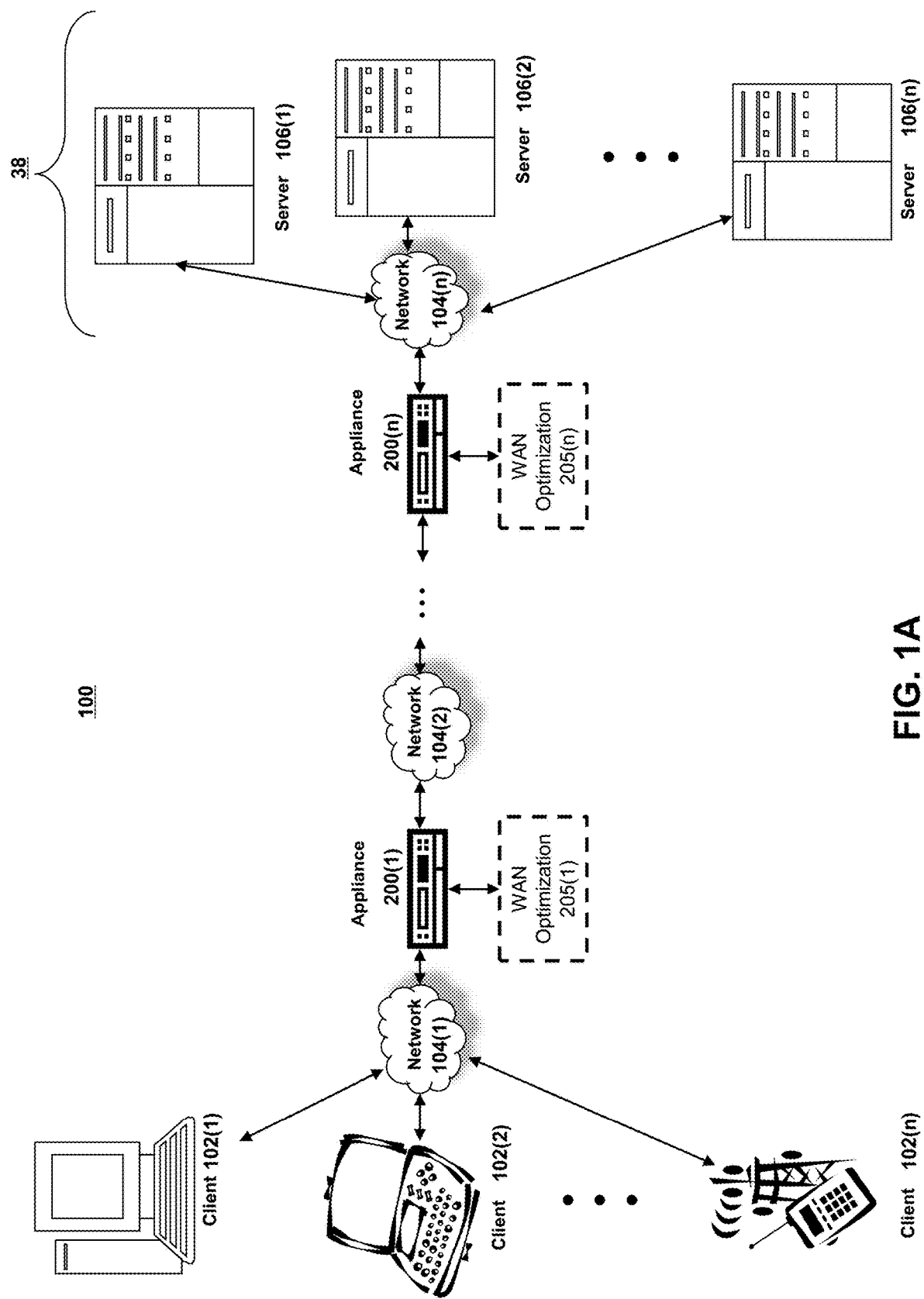
FIG. 1A is a block diagram of a network computing system, in accordance with an illustrative embodiment.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment;

Section E describes embodiments of systems and methods of providing or using a virtual channel to provide insights; and Section F describes embodiments of systems and methods for managing network resources for delivery virtual applications and desktops.

A. Network and Computing Environment

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as CloudBridge® products sold by Citrix Systems, Inc. of Fort Lauderdale, Fla.

Figure 1B:
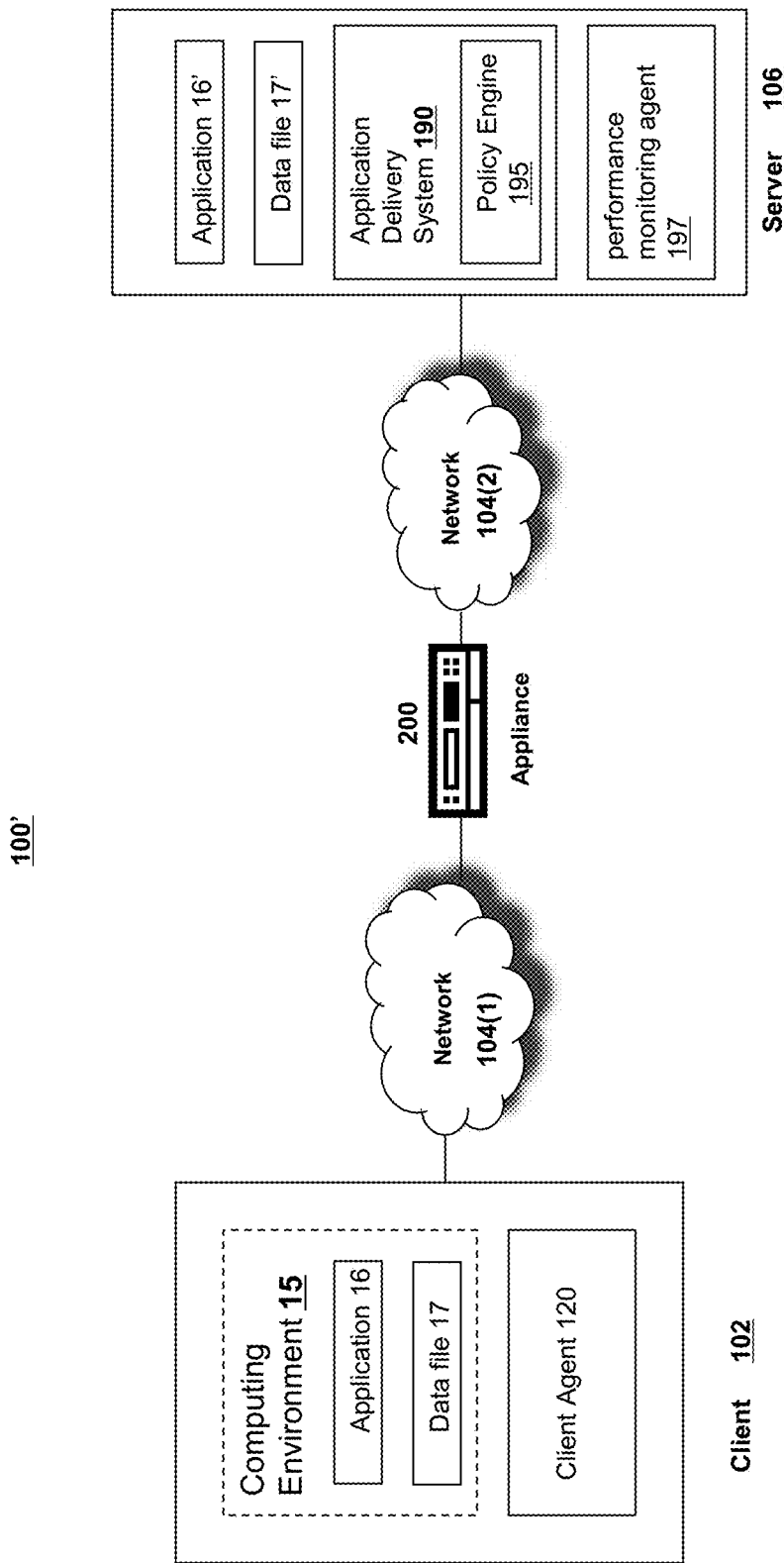
FIG. 1B is a block diagram of a network computing system for delivering a computing environment from a server to a client via an appliance, in accordance with an illustrative embodiment.

Referring to FIG. 1B, an example network environment 100' for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered to the client 102 via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 50 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
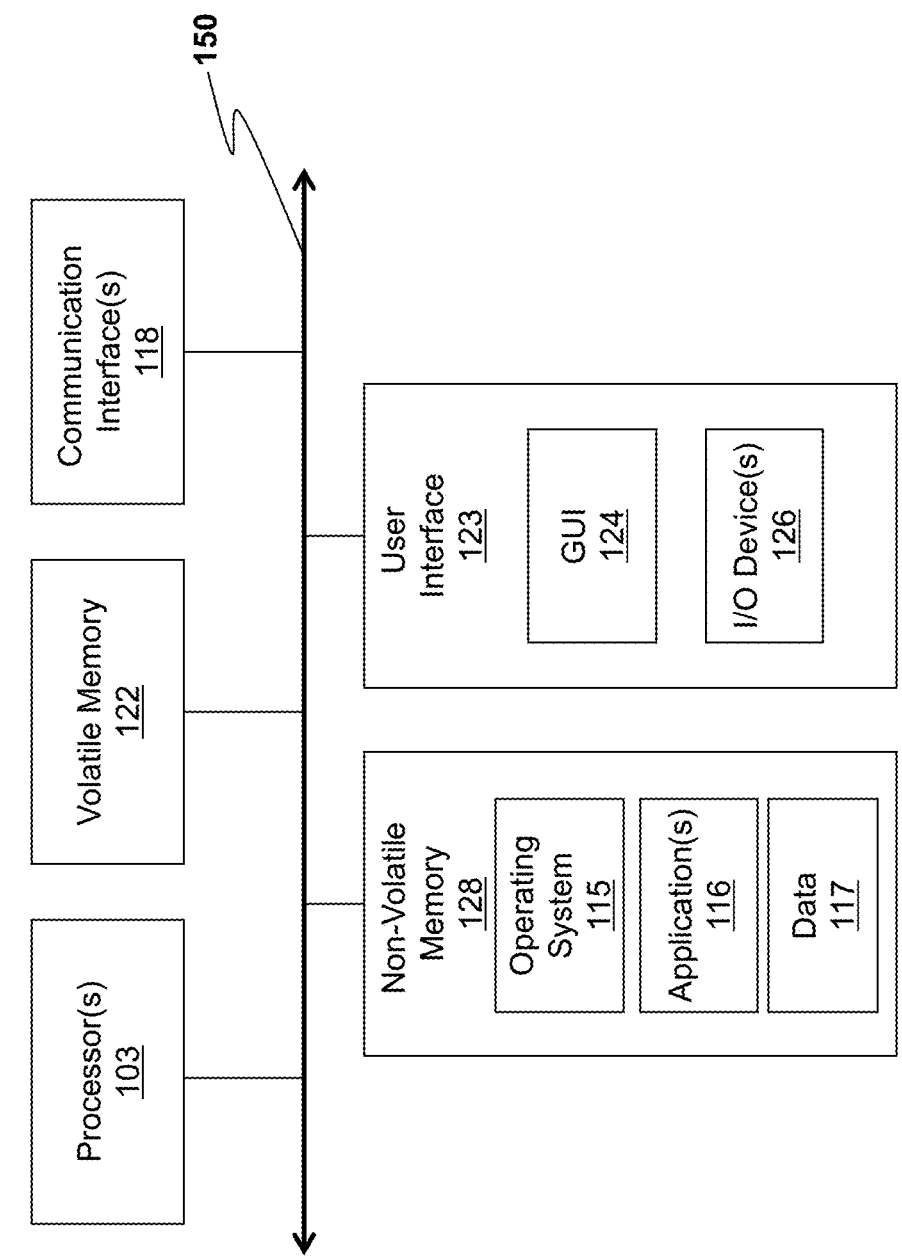
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

B. Appliance Architecture

Figure 2:
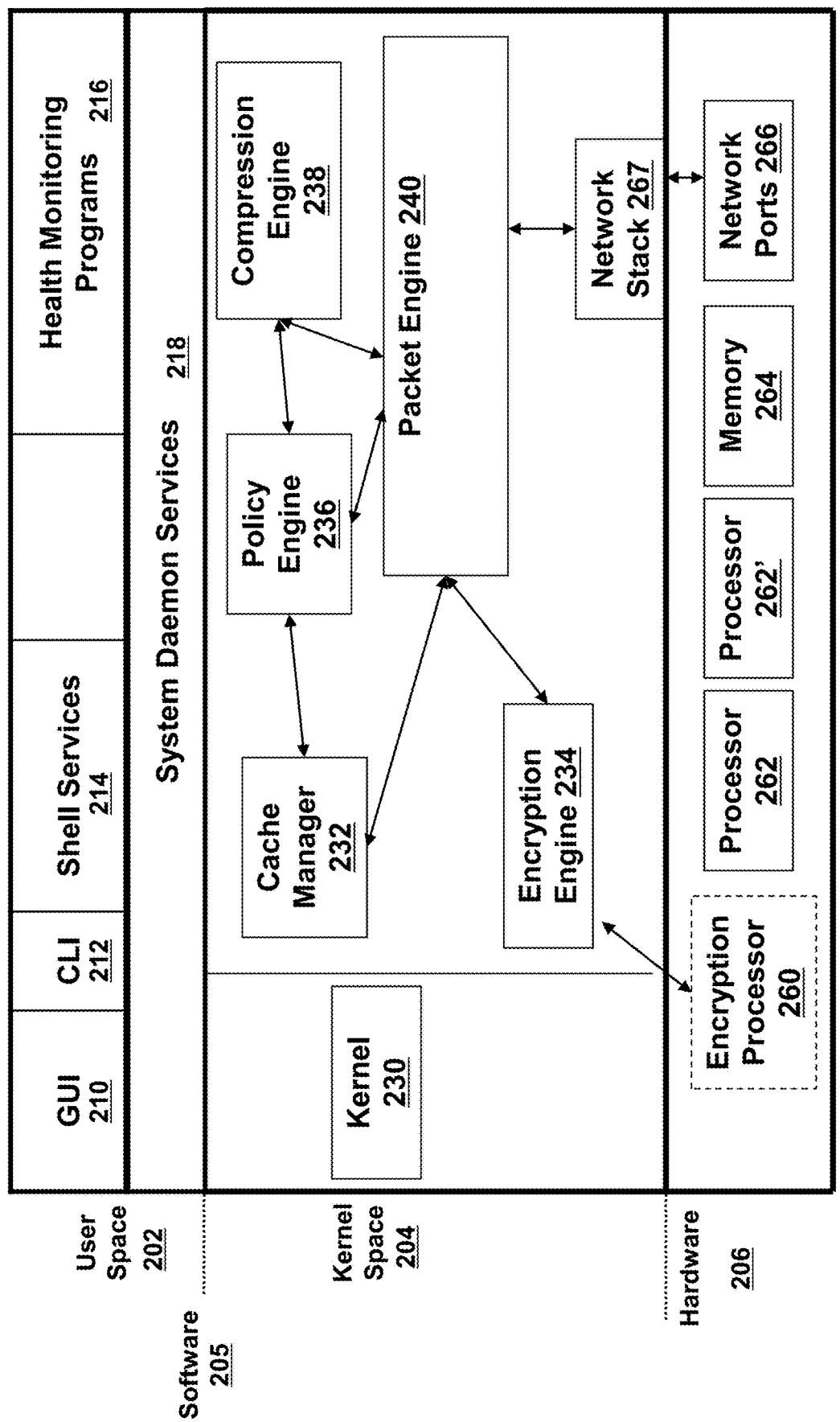
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reduce the access time of the data. In some embodiments, the cache manager 232 may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine whether a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a XEN hypervisor, for example as provided by the open source Xen.org community. In an illustrative embodiment, device 302 executing a hypervisor that creates a virtual machine platform on which guest operating systems may execute is referred to as a host server. In such an embodiment, device 302 may be implemented as a XEN server as provided by Citrix Systems, Inc., of Fort Lauderdale, Fla.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
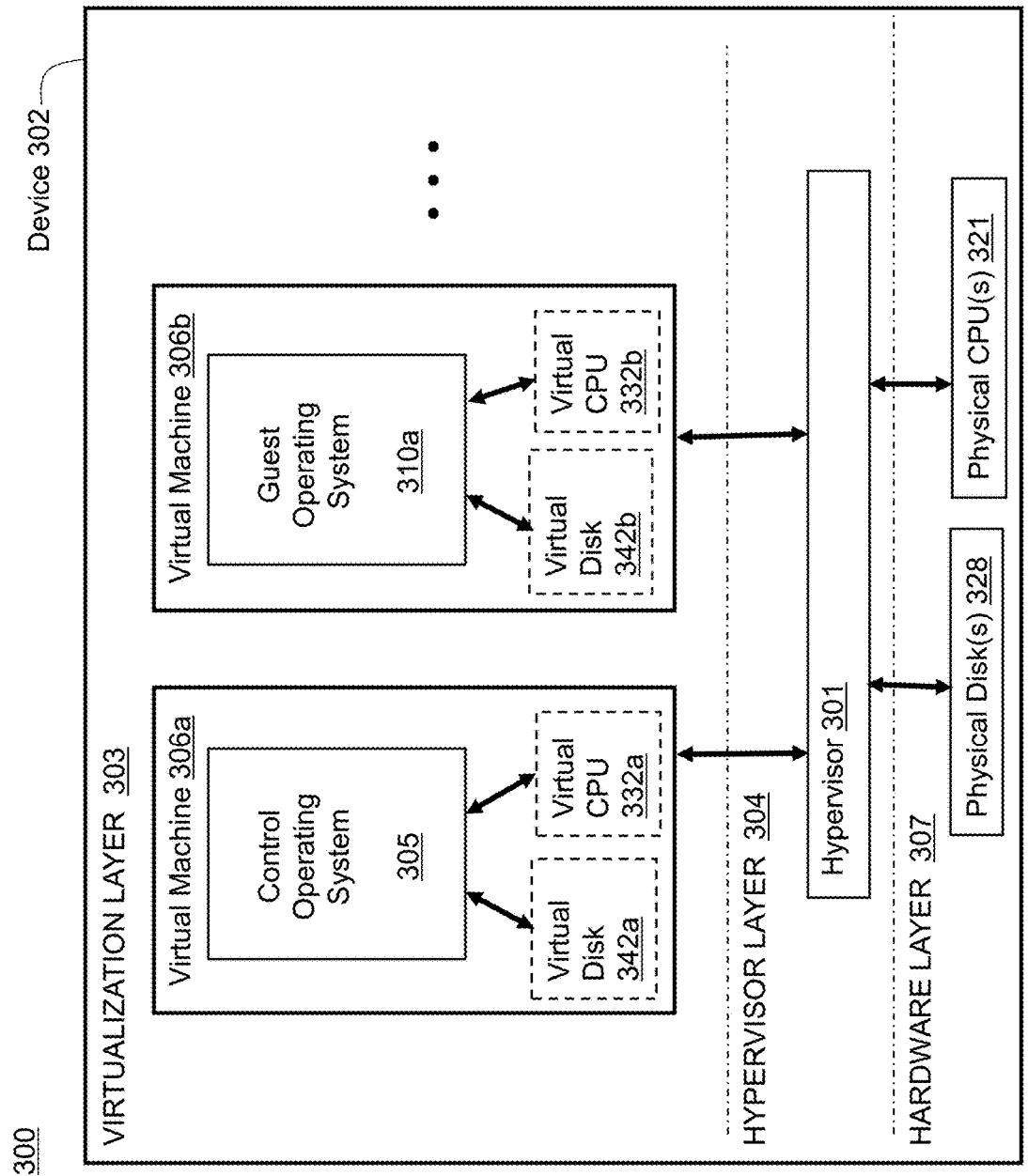
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hash values from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

D. Systems and Methods for Providing a Distributed Cluster Architecture

Figure 4:
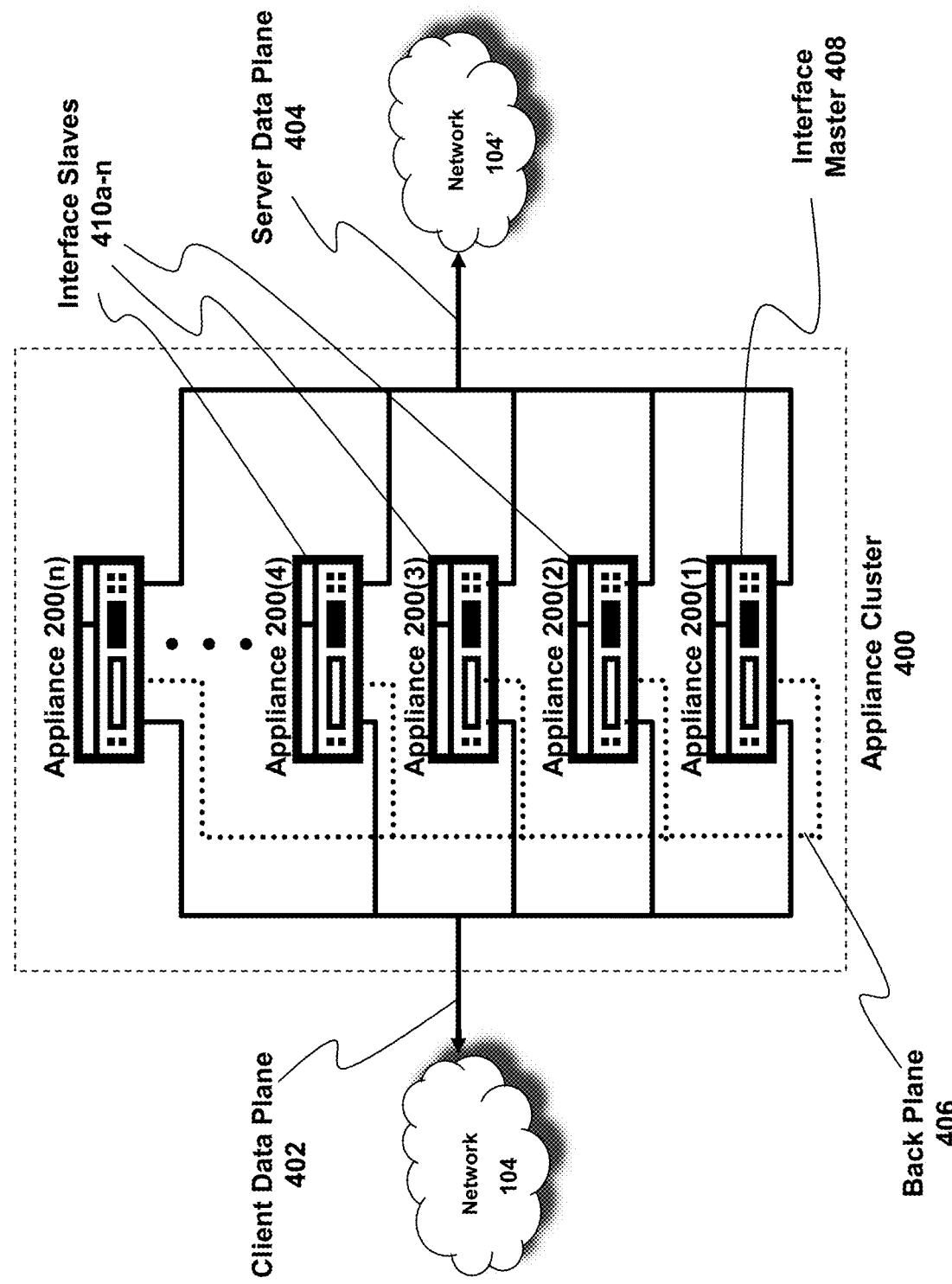
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a client-side network 104 via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104' via server data plane 404. Similar to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or backplane 406. Backplane 406 may enable inter-node or inter-appliance control and configuration messages, for inter-node forwarding of traffic, and/or for communicating configuration and control traffic from an administrator or user to cluster 400. In some embodiments, backplane 406 may be a physical network, a VPN or tunnel, or a combination thereof.

E. Systems and Methods for Providing and Using a Virtual Channel to Provide Insights Described herein are systems and methods for providing insights or metrics in connection with provisioning applications and/or desktop sessions to end-users. Network devices (e.g., appliances, intermediary devices, gateways, proxy devices or middle-boxes) such as Citrix Gateway and Citrix software-defined wide area network (SD-WAN) devices can gather insights such as network-level statistics. Additional insights (e.g., metadata and metrics) associated with virtual applications and virtual desktops can be gathered to provide administrators with comprehensive end-to-end real-time and/or historical reports of performance and end-user experience (UX) insights. In some embodiments, to obtain the insights, the network devices may have to perform deep parsing of virtualization and other protocols such as Citrix independent computing architecture (ICA), remote desktop protocol (RDP), or Citrix high definition experience (HDX), along with some or all associated virtual channels (VCs).

This deep parsing can demand or entail knowledge of all underlying protocol details, and can be resource intensive. The effort for a network device to deeply parse, decrypt and/or decompress traffic (e.g., HDX traffic) can hurt the scalability of the network device and can significantly increase the cost of supporting (e.g., HDX specific) insights. These can be memory and CPU intensive operations that directly affect the number of connections (e.g., ICA connections) that a network device (e.g., Citrix Gateway or SD-WAN appliance) can support at a time. Deep parsing of such traffic can be a memory and CPU intensive operation, mainly because of the stateful decompression of the ICA stream. "Stateful" can refer to maintaining, tracking, keeping, storing and/or transitioning of state(s) across connections, sessions, time and/or operations, for example. To address these and other challenges, the present disclosure provides embodiments of methods and systems for delivering insights of a virtual session to a network device in a real-time, scalable and/or extensible manner (e.g., without deep parsing by a network device). In some embodiments, a separate or independent VC (sometimes referred to as an App Flow VC) can be established across or between a client-side agent (e.g., desktop virtualization client), network device(s) and a server-side agent (e.g., VDA) for the transmission of insights (e.g., virtualization session insights). The App Flow VC can be negotiated between these entities (e.g., between the desktop virtualization client, network appliances and VDA). The App Flow VC can facilitate scalable and extensible processing of insights. The App Flow VC can remain non-interleaved with other VCs in a HDX/ICS stream, and the stream can be uncompressed to facilitate access to and parsing of the App Flow VC. Such simple parsing consumes significantly lower levels of resources, and improves the operation of the network device by allowing more resources of the network device to perform any other functions, such as to process a larger number of connections (e.g., ICA connections) at a given time. Even if a larger number of connections is not necessary, lower consumption of CPU resources for instance results in lower power consumption (e.g., lower energy wastage to obtain similar insights) and/or heat generation, as compared with deep parsing. Hence, the present system and methods allow for substantive improvements in the operation of system components such as network devices (e.g., SD-WAN and gateway devices).

Further, embodiments of the present methods and system can improve the HDX/ICA platform in addition ways. For example, embodiments of the present methods and system can provide or support state transition of App Flow insights or metrics during network device failover (e.g., high-availability failover), hence improving operation during such failover. Certain embodiments of the present methods and system provide or support efficient identification and prioritization of Multi-stream ICA (MSI) HDX streams, which reduces resources to access and process data from such streams. Some embodiments of the present methods and system provide or support layer 7 (L7, application layer) latency calculation and communication independent of server processing time. Some embodiments of the present methods and system provide or support L7 latency calculation and communication between multiple network devices. Hence, these solutions can provide metrics that more accurately characterizes the health and performance of specific network components, segments or connections.

Figure 5:
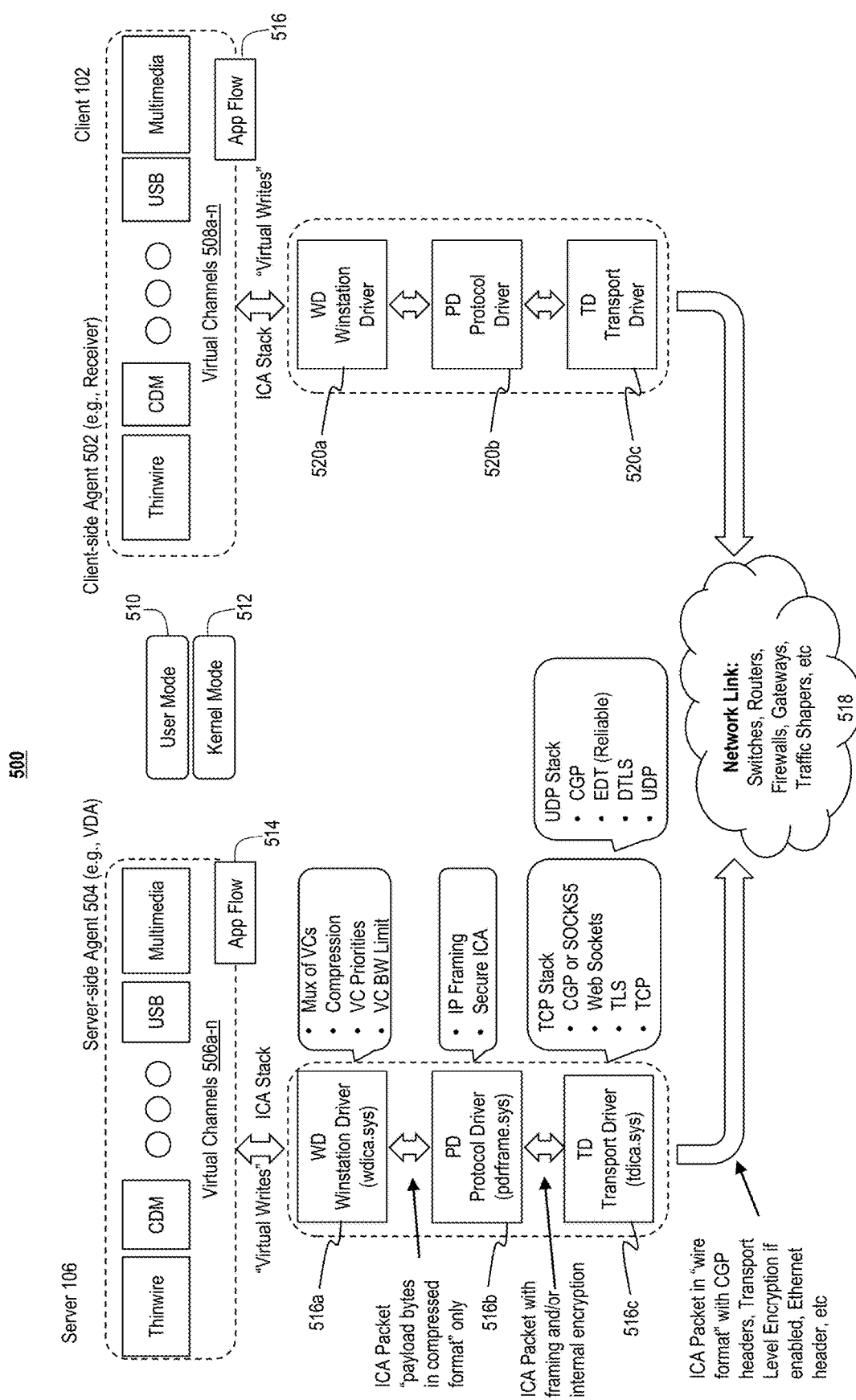
FIG. 5 is a block diagram of an embodiment of a system for providing or using a virtual channel to provide insights, according to an illustrative embodiment.

In an ICA or HDX configuration for instance, VCs can support a remote computing experience at a client 102, by providing access to one or more applications and/or remote desktops hosted on a server 106. As shown in FIG. 5, VCs can be established using a server-side agent 504 and a client-side agent 502. As illustrated in FIG. 5, the system 500 can include a client 102 with a client-side agent (e.g., Receiver), a server 106 with a server-side agent (e.g., VDA), ICA stacks on each of the client 102 and the server 106, that supports the HDX session via a network link. Each of the ICA stacks can include a WinStation driver (WD), a protocol driver (PD), and/or a transport driver (TD), each involving one or more corresponding protocols.

VCs can support communications and functionalities between the client 102 and the server 106, in provisioning an application or desktop via remote delivery to the client 102. Virtual channels can provide a secure way for an application running on the server 106 to communicate with the client 102 or the client-side environment. Each virtual channel can support communications for supporting or enabling one or more functionalities of the application or desktop, such as graphics, disks, COM ports, LPT ports, printers, audio, video, smart card, and so on, so that these functionalities are available across the client 102 and the server 106. Some virtual channels can be loaded or established in user mode, and some others can be loaded or established in kernel mode. A client virtual channel, for example, can be routed through a WinStation driver (e.g., in the server-side ICA stack), and can be polled on the client-side by a corresponding WinStation driver (e.g., in the client-side ICA stack). On the client side, virtual channels can correspond to virtual drivers each providing a specific function. The virtual drivers can operate at the presentation layer protocol level. There can be a number of these protocols active at any given time by multiplexing channels that are provided by for instance the WinStation protocol layer (or WinStation driver). Multiple virtual channels can be combined or multiplexed within a provisioning session (e.g., an ICA/HDX session or traffic stream).

Virtual channels can be created by virtualizing one or more "physical" channels, each virtualized into one or more virtual channels. For example, several virtual channels may be identified separately and can carry different types of communications, but may share the same port corresponding to a physical channel. The use of virtual channels can allow sharing or data multiplexing on a single non-virtual channel to support multiple streams of information. One or more virtual channels may operate to communicate presentation layer elements from the server to the client device. Some of these virtual channels may communicate commands, function calls or other messages from the client device to an application or a remote desktop's operating system. These messages may be used to control, update or manage the operation and display of the application or desktop.

By way of example, a client-side agent 502 may receive, from a server-side agent 504 via a provisioning (e.g., ICA, RDP, HDX) session, data associated with a remote desktop environment generated on a server 106 (e.g., a XenDesktop server). In some embodiments, the client-side agent 502 may be provided as a dynamically linked library component for example, that receives window creation and window process data from the server-side agent 504 for use in displaying a local version of a window generated on the server 106. In some embodiments, the client-side agent 502 may receive data such as window attribute data over one or more connections. The one or more connections may be multiplexed into one or more virtual channels. Such multiplexing may allow for different virtual channels to have different bandwidth limits or different priorities, while still being part of a single transport layer connection. This can reduce the transport layer overhead required and provide for SSL or VPN tunnel capability, while still allowing per-channel compression, buffering, and management of communication priority between the client-side agent 502 and the server-side agent 504. The virtual channels may be dedicated to specific content types or purposes. For example, a first high-priority virtual channel may be dedicated to transmission of application output data, while a second low-priority virtual channel may be dedicated to transmission of taskbar thumbnail images. A plurality of virtual channels can be used for communicating one or more types of application data (e.g., audio, graphics, metadata, printer data, disk data, smart card data, and so on). For instance, some types of application data can each be conveyed or communication via a dedicated virtual channel within the provisioning session, and/or certain types of application data can each be conveyed or communication to the intermediary device by sharing one or more virtual channels.

In a HDX session for delivering an application or desktop (e.g., via Citrix XenApp/XenDesktop), the protocol exchange between a client-side agent (e.g., Citrix Receiver) and a server-side agent (e.g., Citrix XenApp/XenDesktop virtual delivery agent (VDA)) can involve multiple protocols including a core ICA protocol and protocols for VCs representing various technologies, such as graphics, multimedia, printing, drive mapping, windowing, user input, etc. Deep parsing (e.g., decompression, decoding, decryption and/or de-interleaving) of such virtualization protocols and/or VC data streams can consume significant processing resources and greatly limit the scalability of network devices. For instance, network devices (e.g., Citrix Gateway and SD-WAN) can deeply parse ICA traffic flowing through a network, having one or more protocols such as transmission control protocol (TCP) or transport layer security (TLS), enlightened data transport (EDT) or datagram transport layer security (DTLS) or user datagram protocol (UDP), common gateway protocol (CGP), ICA framing, custom ICA encryption (e.g. secure ICA), ICA protocol itself (e.g., including compression, such as stateful context-based compression) and interleaving of individual core ICA or VC data streams, and the individual VC protocols in order to gather various information or insights from a HDX session for instance.

In addition to HDX, RDP or ICA based sessions, other types of communications sessions are contemplated that can include various channels or connections of data streams (e.g., with features similar to virtual channels), and may involve various corresponding protocols. Insights, metrics, analytics, statistic and/or other information (hereafter sometimes generally referred to as insights) relating to the communication session can be used to determine and/or improve user experience and the overall health of the infrastructure of the communications session (e.g., XenApp/XenDesktop infrastructure), and the applications (e.g., Microsoft Office applications, remote desktop application) being delivered using the infrastructure. The insights can be combined with other network-health analysis performed by network devices, and/or processed by the network devices (e.g. Citrix Gateway or Citrix SD-WAN). In addition, such collective insights may be provided to a management and triaging utility (e.g. Citrix Director), a management analytics service, or a third-party collector tool. The collective insights and/or these tools can allow administrators to view and analyze real-time client, host and network latency metrics, historical reports and/or end-to-end performance data, and can allow the administrators to troubleshoot performance and network issues.

However, the effort for a network device to deeply parse, decrypt and/or decompress traffic (e.g., HDX traffic) can hurt the scalability of the network device and can significantly increase the cost of supporting (e.g., HDX specific) insights. These can be memory and CPU intensive operations that directly affect the number of connections (e.g., ICA connections) that a network device (e.g., Citrix Gateway or SD-WAN appliance) can support at a time. Deep parsing of such traffic can be a memory and CPU intensive operation, mainly because of the stateful decompression of the ICA stream. "Stateful" can refer to maintaining, tracking, keeping, storing and/or transitioning of state(s) across connections, sessions, time and/or operations, for example.

In some embodiments, adding additional insights for retrieval by a network device may entail updating one or more of the session protocols (e.g., the HDX protocols). Parsing multi-stream ICA (MSI) streams can further complicate the network device's parsing mechanism, logic and/or methods. High-availability (HA) failovers from one network device to another can also be complicated by the process or requirement of transitioning very large and complex state between the devices in order to continue gathering insights. High-availability, for instance, can refer to a system being tolerant to failure, such as using hardware redundancy. In some embodiments, measuring the roundtrip latency between client-side and server-side agents (e.g., Citrix Receiver and VDA) can be affected by server load and server processing time.

To address these and other challenges, the present disclosure provides embodiments of methods and systems for delivering insights of a virtual session to a network device in a real-time, scalable and/or extensible manner (e.g., without deep parsing by a network device). In some embodiments, a separate or independent VC (sometimes referred to as an App Flow VC) can be established across or between a client-side agent (e.g., desktop virtualization client), network device(s) and a server-side agent (e.g., VDA) for the transmission of insights (e.g., virtualization session insights). The App Flow VC can be negotiated between these entities (e.g., between the desktop virtualization client, network appliances and VDA). The App Flow VC can facilitate scalable and extensible processing of insights.

Some embodiments of the present methods and system provide or support state transition of App Flow insights or metrics during network device failover (e.g., high-availability failover). Certain embodiments of the present methods and system provide or support efficient identification and prioritization of MSI HDX streams. Some embodiments of the present methods and system provide or support layer 7 (L7, application layer) latency calculation and communication independent of host processing time. Some embodiments of the present methods and system provide or support L7 latency calculation and communication between multiple network devices.

Referring again to FIG. 5, the system 500 can incorporate an App Flow VC for providing insights, according to an illustrative embodiment. The App Flow VC can incorporate one or more features of the VCs discussed above. In some aspects, the App Flow VC can be identical or similar to another VC except that the App Flow VC is configured to carry a different type of data stream than that carried by the another VC. The network link, which can include the client 102, server 106 and the ICA stacks, can communicate a data stream of the App Flow VC. The data stream can carry insights that can be accessed by device(s) in the network link.

The systems and methods of the present disclosure may be implemented using or involving any type and form of device, including clients, servers and/or appliances 200 described above with reference to FIG. 1A-FIG. 1B, FIG. 2 and FIG. 4. As referenced herein, a "server" may sometimes refer to any device in a client-server relationship, e.g., an appliance 200 in a handshake with a client device 102. The server 106 may be an instance, implementation, or include aspects similar to server 106a-n described above with reference to at least FIG. 1A. Similarly, the client 102 may be an instance, implementation, or include aspects similar to any of the clients 102 a-n described above with reference to FIG. 1A. The present systems and methods may be implemented using or involving an intermediary device or gateway, such as any embodiments or aspects of the appliance or devices 200 described herein. The systems and methods may be implemented in any type and form of environment, including multi-core devices, virtualized environments and/or or clustered environments as described herein.

The server 106 may host one or more applications or services. Each of the applications or services 510 can include or correspond to any type or form of application or service. The application or service may include a network application, a web application, a Software-as-a-Service (SaaS) application, a remote-hosted application, and so on. As some non-limiting examples, an application can include a word processing, spreadsheet or other application from a suite of applications (e.g., Microsoft Office360, or Google docs), an application hosted and executing on a server for remote provisioning to a client, a desktop application, and/or a HTML5-based application. Packets corresponding to an application or service 510 may be compressed, encrypted and/or otherwise processed by the VDA and/or ICA stack (sometimes referred to as HDX stack, or VDA HDX stack) of the server 106, and transmitted or delivered to the client 102. The VDA may include the ICA stack, and can terminate one end of a VC at the server-side agent 504, with the client-side agent 502 terminating the other end of the VC.

In some embodiments, the client 102 may reside at a branch office and may operate within a client-side network, which may include or correspond to a private network (e.g., a local area network (LAN) or wide area network (WAN)). In some embodiments, the server 106 and the client 102 may be communicably coupled to one another via a private network (e.g., a LAN or a software-defined wide area network (SD-WAN)). The server 106 may reside at a server or data center, and may operate within a server-side network, which may also be a private network (e.g., a LAN, WAN, etc.).

One or more network devices can be intermediary between the client 102 and the server 106. A network device 508 can include or correspond to any type or form of intermediary device, network device or appliance, gateway device, middle box device and/or proxy device, such as but not limited to a NetScaler device, SD-WAN device, and so on. Each of the server 106, client 102, network device(s) 508 may be communicably coupled in series.

Negotiation and Establishment of an App Flow VC for Transmission of Insights

The server-side agent 504 (e.g., VDA) executing on the server 106 may initiate establishment of an App Flow VC. The server-side agent 504 may initiate establishment of an App Flow VC with a client-side agent 502 (sometimes referred as a desktop virtualization client) and/or network device(s) in the path between the server 106 and the client 102. All or some of the server-side agent 504, the client-side agent 502 (e.g. Citrix Workspace App (CWA) or Citrix Receiver), and the network device(s) (e.g., e.g. Citrix Gateway, Citrix Gateway Service, Citrix SD-WAN) along the network link can choose to participate in the negotiation of the App Flow VC. These device(s) can advertise their presence and/or capabilities to support the App Flow VC.

For example, the server-side agent's HDX stack can initiate, establish or otherwise enable the App Flow VC, and can send its host-to-client (e.g., server 106 to client 102) insights data on a HDX connection (e.g., using ICA or Common Gateway Protocol (CGP)). The HDX connection may be the same as a HDX connection for carrying one or more other VCs (or HDX VCs), except that the App Flow VC that it carries may be uncompressed and/or non-interleaved with any other HDX VC(s). This is to facilitate efficient parsing of the App Flow VC by network device(s) in the network connection. Any of network device(s) and the client-side agent 502 (e.g., Receiver) may pare and interpret, or simply ignore the insights data in the App Flow VC. Within the App Flow VC, insights data may be sent in a self-descriptive, light-weight extensible format, e.g. in JavaScript Object Notation (JSON) format.

Similarly, the client-side agent's HDX stack may establish or enable the App Flow VC, and send its client-to-host (e.g., client 102 to server 106) insights data via the App Flow VC. The App Flow VC may remain uncompressed and/or non-interleaved with other HDX VCs to facilitate efficient parsing by network device(s). The server-side agent 504 (e.g., VDA) may parse and interpret, or simply ignore the client-to-host insights data in the App Flow VC.

In some embodiments, an App Flow protocol capability or data structure is used to negotiate a configuration (e.g., capabilities) for the App Flow VC, which can include advertising support for the App Flow VC by different entities (e.g., along the network link). The entities can advertise their support for the App Flow VC by performing capabilities exchange between the entities. The entities that are involved in the negotiation can include at least one of the following: (a) server 106 (host), (b) network device A (e.g., gateway), (c) server-side network device B (e.g., SD-WAN device), (d) client-side network device C (e.g., SD-WAN device), or client 102. The capabilities exchange between the entities can determine a behavior of App Flow VC for a particular HDX session. More than one network device (e.g., gateway device, SD-WAN device) may participate in the negotiation. The capabilities exchange can include an entity reporting or advertising an App Flow capability of the entity to one or more entities, or exchanging its App Flow capability with that of one or more other entities.

Figure 6:
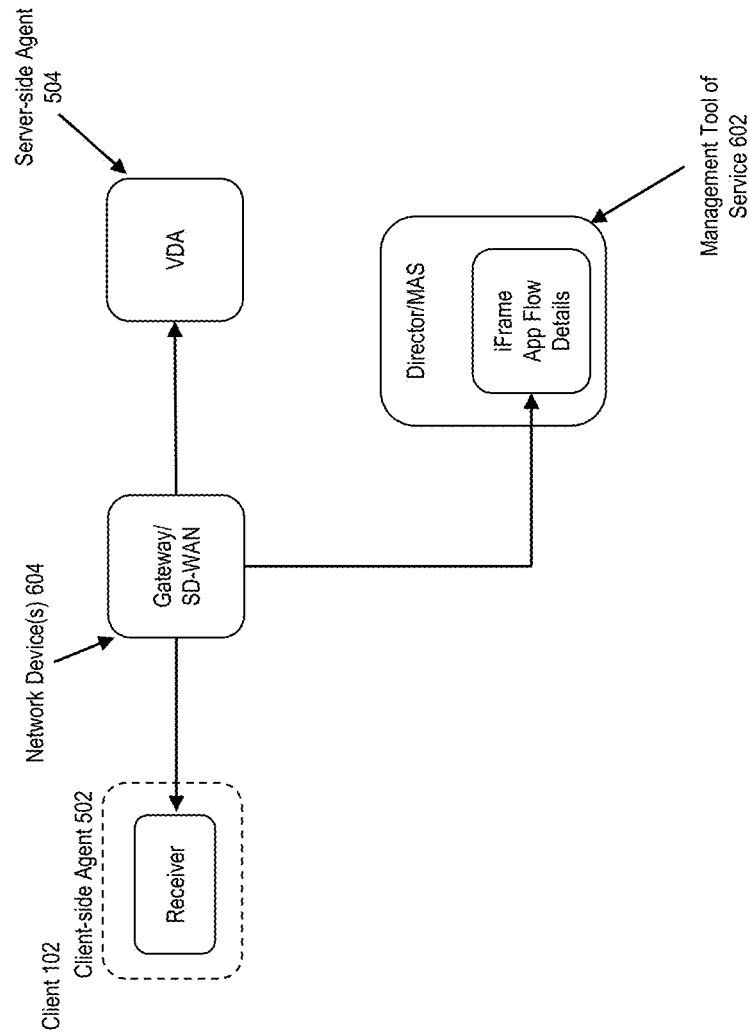
FIG. 6 is a diagram of an embodiment of a system and method for providing or using a virtual channel to provide insights, according to an illustrative embodiment.

In some embodiments, the App Flow VC capability may include at least one of the following information or data fields:

Host (or server) Protocol Version
Host (or server) Flags
Gateway Protocol Version
Gateway Flags
Host (or server) side SD-WAN Protocol Version
Host (or server) side SD-WAN Flags
Client side SD-WAN Protocol Version
Client side SD-WAN Flags
Client Protocol Version
Client Flags
Session Protocol Version
Session Protocol Flags Referring to FIG. 6, a method 600 of negotiating for and using an App Flow VC is depicted, in accordance with an illustrative example. Also depicted in FIG. 6 is a client-side agent 502, a server-side agent 504, network device(s) 604, and a management tool or service 602, that interoperate in connection with the method. As illustrated, various embodiments of the method can include all or some of a number of operations 1 through 8'.

Referring to operation 1, the server-side agent 504 (e.g., VDA) may report a new App Flow capability in a message (e.g., init-request message or packet). If the server 106 does not support the App Flow VC feature or if the App Flow VC feature is disabled in the server 106, the App Flow capability of the server-side agent 504 is not sent to the other entities. Otherwise, the server 106 sends the App Flow capability with the server's protocol version set to the highest version that the server can support. The server may also set additional flags identifying granular App Flow features. In some embodiments, all or some other data fields (e.g., described above) are initially set to zero (e.g., set to 0 by default, or blanked out). The App flow capability may be sent in the message (e.g., an ICA init-request packet) from the server 106 to the client 102.

Referring to operation 2, a network device can set its network device (e.g., gateway or SD-WAN) protocol version in the App Flow capability in the message (e.g., init-request message or packet). Each network device in the server-to-client path (e.g., in the network link) may receive or intercept the message (e.g., init-request packet). The corresponding network device may parse the App Flow capability in turn along the server-to-client path, and set the corresponding network device's respective App Flow protocol version to the highest version it can support. Each network device may also set additional flags identifying granular App Flow features. A protocol version of 0 (e.g., the initial/default value of 0 remains unchanged or is not set by a corresponding network device) may indicate that the corresponding network device is not present in between the server 106 and the client 102 in the network link. If the corresponding network device residing between the server 106 and the client 102 does not support the App Flow protocol or if the App Flow feature is disabled at the corresponding network device, the capability is left unchanged (e.g., the protocol version remains zero). All other data fields in the App Flow capability are left unmodified.

Referring to operation 3, the client-side agent 502 (e.g., Receiver) may report the capability for the WinStation Driver at the client-side ICA/HDX stack, in the message (e.g., init-response message or packet). If the client does not support the App Flow feature or the feature is disabled at the client 102, the capability is not sent back to the host (e.g., the init-response packet is not transmitted back to the server 106). The capability is also not sent back to the server 106 if there is no network device present between the client 102 and the server 106, and/or there is no server-side agent 504 support for the App Flow VC feature, as indicated by the respective protocol version data fields being zero (e.g., protocol versions of all possible network devices are blanked out or set to zero, and/or protocol version of server 106 is blanked out or set to zero), or lack of App Flow capability being reported by the server 106. Otherwise, the client 102 can send back the App Flow capability to the host, mirroring or maintaining all server and network device data fields that have already been set. The client 102 can set the client's protocol version to the highest version it can support. The client 102 may also set additional flags identifying granular App Flow features. The App Flow capability may be sent in an ICA init-response packet that is transmitted from the client 102 to the server 106.

Referring to operation 4, the client 102 may provide VC-bind information in the message (e.g., in the init-response for the Winstation Driver). The VC-bind information may include App Flow VC in WinStation Driver VC-bind structures. The VC-bind information may include, indicate or identify a protocol name to ID number binding (sometimes referred to as a protocol name to ID number association). The protocol name may refer to or identify the core ICA protocol or a protocol of the App Flow VC. The ID number may identify or refer to at least one of: an associated VC module, the App Flow VC, or the WinStation Driver. The client 102 (e.g., client-side agent 502, or WinStation Driver) may provide or assign the protocol name to ID number binding to an App Flow module that is responsible for implementing the App Flow VC at the client 102. The VC module can be part of the WinStation Driver, or include the WinStation Driver, or may be separate from the WinStation Driver. The VC module can be part of the client-side agent 502 (e.g., VDA), or include the client-side agent 502, or may be separate from the client-side agent 502. The client may load the VC module to implement, initiate and/or establish the App Flow VC at the client 102. The client may send or report the VC-bind information to the server 106 in the same message (e.g., init-response packet or message) or another message (e.g., another init-response packet or message). The VC-bind information may be sent on behalf of the WinStation Driver responsible for implementing the core ICA protocol that supports the App Flow VC and/or any other VCs. The server 106 can receive the VC-bind information (e.g., VC protocol name to ID number binding), and can use the VC-bind information to access or otherwise open the App Flow VC and send data on it. The VC-bind information can be used by any of the network device(s) in the network link to find and parse out the App Flow VC among other VCs and core protocol.

Referring to operation 5, the server 106 may commit capabilities for the App Flow VC and/or the ICA/HDX session. The server 106 may receive a message (e.g., init-response packet or message) from the client 102, which can include at least one of: the App Flow capability or the VC-bind information. The server can parse, extract, determine and/or analyze the App Flow capability received from the client 102. For example, the server can detect, identify or determine the protocol versions and/or additional flags that might have been set by the client and network device(s) in the App Flow capability.

The server can compute or determine a Session protocol version and/or Session protocol flag(s), for instance using or according to information set in the App Flow capability. For example, the Session protocol version may be set to either 0 or the minimum value of the protocol versions reported by all of the entities (e.g., server, network device(s), client). The Session protocol version can be set to 0 if no network device between the client and the server supports it (e.g., supports the App Flow VC or feature), or if the client 102 does not support it (e.g., supports the App Flow VC or feature), or if the App Flow VC itself is not reported by the client in a protocol name to ID number binding, and/or if there is neither protocol-level encryption or custom App Flow VC-level encryption negotiated for the session. If the value of the Session protocol version is 0, then no App Flow VC is created or established for the session (e.g., ICA, RDP or HDX session).

The server can commit or finalize the Session protocol version (e.g., if this value is not 0) and/or the Session protocol flag(s) that are computed or determined. The server can communicate or propagate the committed Session protocol version and/or the Session protocol flag(s) to all other entities (e.g., network device(s), client) by including these in an App Flow capability in a message (e.g., an init-connect packet or message) sent from the server to the client. All or some of these entities can read the committed Session protocol version and/or Session protocol flag(s). This process can avoid creating the App Flow VC and/or sending App Flow data points (e.g., insights) unnecessarily if no network devices in the network link (between the client and the server) is present, interested in or capable of processing the App Flow insights, and/or if the client-side agent 502 does not support the App Flow feature, and/or if encryption (e.g., protocol-level encryption, or custom App Flow VC encryption) is not negotiated or present. For instance, and in some embodiments, the capability exchange process described herein may also be used to negotiate custom App Flow VC protocol-level encryption methods and keys, so that data sent over the App Flow VC can only be decrypted by a designated network device or the client (e.g., that has access to the custom App Flow VC protocol-level encryption methods and keys).

The server 106 can initiate, establish, create and/or open the App Flow VC, and can start inserting, writing, providing and/or sending various insights (e.g., events and data points) into the App Flow VC. The server 106 can initiate, establish, create and/or open the App Flow VC, and/or provide the insights, responsive to at least one of: determining that the Session protocol version is not 0, committing the Session protocol version and/or the Session protocol flag(s), or sending the committed Session protocol version and/or the Session protocol flag(s) to the other entities. The server 106 can open or create the App Flow VC in the session (e.g., HDX or ICA session), and can leave the protocol packets of App Flow VC (and/or other VCs) uncompressed (e.g., in the top level ICA/HDX protocol), and can leave the protocol packets of App Flow VC (and/or other VCs) non-interleaved (e.g., to facilitate parsing by other entities). The App Flow VC data stream can be compressed (e.g., at the App Flow protocol level). The server 106 can provide session data (e.g., in JSON format or protocol) from various stack or VC components, into corresponding VCs, which may be implemented in user or kernel-mode. The session data can include insights that are directed into the App Flow VC. The App Flow VC can carry messages formed and sent in JSON format, to facilitate parsing by interested entities (e.g., network devices) and/or the client, and to ensure easy extensibility. For instance, the network devices (e.g., gateway and/or SD-WAN devices) may be configured to support and understand the JSON format. However, any other format can be used, that for instance is supported by the entities and/or can be efficiently transmitted and processed.

The App Flow VC can communicate, transmit, carry or convey one or more App Flow messages (e.g., in JSON or other format). Each App Flow messages may include at least one of:

Transport stack connection ID

HDX Session GUID (Facilitates correlation of each individual data point with a user and session environment.)

Terminal Services Session ID

Context (Additional context to allow other entities to correlate data points.)

Timestamp

Source (e.g. Virtual Channel or other system component originating the data point)

And so on

In some embodiments, a message may include or contain at least one of: (a) Key (Name), (b) Type, or (c) Value. Messages may be categorized in at least three different groups/types:

i) Version: Such a message can be a first message (e.g., JSON message) sent over the App Flow VC from server to client. Such a message can denote the JSON protocol version, which may be different from the App Flow VC protocol version. Such a message can be used to advertise the set of events and data points implemented by the server to other entities. Similarly, such a message may be a first message (e.g., JSON message) sent over the App Flow VC from client to server, and can be used for a similar purpose.

ii) Event: Such a message can allow the server to signal the occurrence of an event on the server. For example, the server may send an event that signals that "something happened" for a particular VC in a HDX session, or indicate another system event. Similarly, such a message can be used by the client to raise events with other entities.

iii) Key Value: Such a message can describe an individual single data point. For example, such a message can describe that a certain data point has this specific value for a virtual channel in an HDX session.

By way of illustration, events can include but is not limited to one or more of the following:

Application launch, timestamp

Application termination, timestamp

Process termination, timestamp

Session disconnection/termination, timestamp

USB announce device

USB device accepted

USB device rejected

USB device gone

USB device reset

USB device reset endpoint

By way of illustration, data points can include but is not limited to one or more of the following:

Domain name

Logon ticket

Server name

Server version

Session type (e.g., desktop, application)

Client name

Client version

Client serial number

Application name

Application module path

Application process ID

Application launch time

Application termination time

Session termination time

Launch mechanism

Automatic reconnection/Session reliability mechanism

ICA Round Trip Time (RTT)

Layer 7 (L7) latency

VC bandwidth

Multi-stream ICA (MSI) stream type (primary or secondary)

Referring to operation 5'. The client can read the session capabilities, can open the App Flow VC, and can write data into the App Flow VC. The client may read the Session protocol version and/or Session protocol flag(s) committed by the server. According to the instructions (e.g., the committed Session protocol version and Session protocol flag(s)), the client may access or open the App Flow VC. Similar to the server, the client may send data points via the App Flow VC in the client-to-server direction, to be retrieved by one or more network devices and/or the server.

Referring to operation 6, a network device (e.g., gateway or SD-WAN device) may read the data (e.g., insights) from the App Flow VC. Each interested or capable network device may read the Session protocol version and/or Session protocol flag(s) committed by the server. As instructed by the server (e.g., via the committed Session protocol version and/or Session protocol flag(s)), a respective network device may efficiently parse (out e.g., relative to deep parsing) the App Flow VC among other VCs and core protocol (e.g., using the VC-bind information), and may read the insights (e.g., data points) carried in the App Flow VC. The VC-bind information (e.g., VC protocol name to ID number association) may be useful to the network device to detect, identify and/or parse out the App Flow VC among other VCs protocol (e.g., VC-specific or VC-level protocols) and core (or top level ICA/HDX) protocol. The network device may ignore all other protocol(s). This can be further facilitated by the fact that the App Flow VC packets are uncompressed (e.g., at the top level protocol) and non-interleaved. This can substantially improve the number of HDX sessions that may be supported by a network device such as a gateway or SD-WAN device. This also improves the user experience on HDX sessions, since a network device is no longer a bottleneck for processing (e.g., deep parsing) and throughput. The network device may decrypt data points (e.g., at the App Flow VC protocol level) if encryption had been negotiated. (See, e.g., test results discussed below)

Referring to operation 7, the network device can combine the received App Flow VC data with additional network analytics. The network device can combine the received App Flow VC data with additional network analytics generated, accessed and/or provided by the network device, to form or produce combined insights. The network device can send the combined insights to a management tool or service for further analysis and/or presentation to an administrator. For example, combined insights may be sent to Citrix Director or Citrix Management and Analytics System (MAS) or a third-party Insights tools. Citrix MAS can correspond to or include a centralized network management and analytics system. From a single platform, administrators can view, manage network devices, and troubleshoot network related issues, or issues with specific published desktops and applications. In some embodiments, the management tool or service (e.g., MAS) may be configured as an App Flow collector on a network device (e.g., Citrix Gateway or Citrix SD-WAN), through which HDX/ICA traffic is flowing. The management tool or service (e.g., MAS) may receive the records (e.g., combined insights) from the network device (e.g., Citrix Gateway or Citrix SD-WAN), analyze the records, and can present them (e.g., in HDX Insight administrator view). The presented data (e.g., in HDX Insights administrator view) may help administrators in troubleshooting issues related to latencies, bandwidth, desktop or application launch time, desktop or application response time, etc.

Referring to operation 8, the client-side agent 502 can read and can drop the App Flow VC data. The client may read some or all data points, and can drop some or all data points that the client is not interested in. The client may parse, extract, read and/or interpret the data points (e.g., provided by the server) from the App Flow VC. For example, the client may log, present information to the end user, respond back to the server, etc. The client may decrypt data points if encryption had been negotiated.

Referring to operation 8', the server-side agent 504 can read and can drop App Flow VC data. Similar to the client, the server may read and/or ignore some or all of the data points sent by the client. For instance, the server may parse, extract, read and/or interpret the data points (e.g., provided by the client) from the App Flow VC. For example, the server may log, present information to the end user, respond back to the client, etc. The server may decrypt data points if encryption had been negotiated.

In some embodiments, the client-side agent 502 (e.g., Receiver) may send some data points on the App Flow VC, which can be correlated with server-side agent 504 (e.g., VDA) data points to provide more insights into an HDX Session. In certain embodiments, the server-side agent 504 (e.g. VDA) may implement, add or insert data points with session or app-specific details, e.g. URL's that may be accessed in the session, etc.

In some embodiments, one or more alternative methods of implementing the App Flow VC may include: (a) Separating CGP connections from a network device to the server-side agent (e.g. VDA); (b) Channeling data from the server-side agent (e.g. VDA) to the monitoring tool/service (e.g. Director/MAS) over an independent transport layer connection; (c) Based on uniquely identifying Connection ID/Session GUID exchanged over HDX protocol, sending tagged data points from each entity (e.g., client-side agent, network device, server-side agent) directly to a Cloud Service. Then the Cloud Service may correlate the data points from the different sources based on a tag (Connection ID/Session GUID). This architecture is more appropriate to customers/organizations that are more willing to accept the use of a Cloud Service as opposed to on-premises customer/organization owned/controlled network devices and services.

Cloud services can be used in accessing resources including network applications. Cloud services can include an enterprise mobility technical architecture, which can include an access gateway in one illustrative embodiment. The architecture can be used in a bring-your-own-device (BYOD) environment for instance. The architecture can enable a user of a client device (e.g., a mobile or other device) to both access enterprise or personal resources from a client device, and use the client device for personal use. The user may access such enterprise resources or enterprise services via a client application executing on the client device. The user may access such enterprise resources or enterprise services using a client device that is purchased by the user or a client device that is provided by the enterprise to user. The user may utilize the client device for business use only or for business and personal use. The client device may run an iOS operating system, and Android operating system, or the like. The enterprise may choose to implement policies to manage the client device. The policies may be implanted through a firewall or gateway in such a way that the client device may be identified, secured or security verified, and provided selective or full access to the enterprise resources. The policies may be client device management policies, mobile application management policies, mobile data management policies, or some combination of client device, application, and data management policies. A client device that is managed through the application of client device management policies may be referred to as an enrolled device. The client device management policies can be applied via the client application for instance.

In some embodiments, the operating system of the client device may be separated into a managed partition and an unmanaged partition. The managed partition may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the client device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is not accessible by unmanaged apps and devices.

The secure applications may be email applications, web browsing applications, software-as-a-service (SaaS) access applications, Windows Application access applications, and the like. The client application can include a secure application launcher. The secure applications may be secure native applications, secure remote applications executed by the secure application launcher, virtualization applications executed by the secure application launcher, and the like. The secure native applications may be wrapped by a secure application wrapper. The secure application wrapper may include integrated policies that are executed on the client device when the secure native application is executed on the device. The secure application wrapper may include metadata that points the secure native application running on the client device to the resources hosted at the enterprise that the secure native application may require to complete the task requested upon execution of the secure native application. The secure remote applications executed by a secure application launcher may be executed within the secure application launcher application. The virtualization applications executed by a secure application launcher may utilize resources on the client device, at the enterprise resources, and the like. The resources used on the client device by the virtualization applications executed by a secure application launcher may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources, and the like. The resources used at the enterprise resources by the virtualization applications executed by a secure application launcher may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application may use the user interaction data as an input to the application operating on the server. In this arrangement, an enterprise may elect to maintain the application on the server side as well as data, files, etc., associated with the application. While an enterprise may elect to "mobilize" some applications in accordance with the principles herein by securing them for deployment on the client device (e.g., via the client application), this arrangement may also be elected for certain applications. For example, while some applications may be secured for use on the client device, others might not be prepared or appropriate for deployment on the client device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the client device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the client device. The enterprise can use a client application, which can include a virtualization application, to allow access to applications that are deemed more properly operated on the server side. In an embodiment, the virtualization application may store some data, files, etc., on the mobile phone in one of the secure storage locations. An enterprise, for example, may elect to allow certain information to be stored on the phone while not permitting other information.

In connection with the virtualization application, as described herein, the client device may have a virtualization application that is designed to present GUIs and then record user interactions with the GUI. The virtualization application may communicate the user interactions to the server side to be used by the server side application as user interactions with the application. In response, the application on the server side may transmit back to the client device a new GUI. For example, the new GUI may be a static page, a dynamic page, an animation, or the like, thereby providing access to remotely located resources.

The client device may use cloud services to connect to enterprise resources and enterprise services at an enterprise, to the public Internet, and the like. The client device may connect to enterprise resources and enterprise services 208 through virtual private network connections. The virtual private network connections, also referred to as microVPN or application-specific VPN, may be specific to particular applications (e.g., as illustrated by microVPNs), particular devices, particular secured areas on the client device (e.g., as illustrated by O/S VPN), and the like. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 254. The single-sign-on processes may allow a user to provide a single set of authentication credentials, which are then verified by an authentication service 258. The authentication service may then grant to the user access to multiple enterprise resources 204, without requiring the user to provide authentication credentials to each individual enterprise resource.

The virtual private network connections may be established and managed by an access gateway. The access gateway may include performance enhancement features that manage, accelerate, and improve the delivery of enterprise resources to the client device. The access gateway may also re-route traffic from the client device to the public Internet, enabling the client device to access publicly available and unsecured applications that run on the public Internet. The client device may connect to the access gateway via a transport network. The transport network may use one or more transport protocols and may be a wired network, wireless network, cloud network, local area network, metropolitan area network, wide area network, public network, private network, and the like.

The enterprise resources may include email servers, file sharing servers, SaaS/Web applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources may be premise-based resources, cloud based resources, and the like. The enterprise resources may be accessed by the client device directly or through the access gateway. The enterprise resources may be accessed by the client device via a transport network. The transport network may be a wired network, wireless network, cloud network, local area network, metropolitan area network, wide area network, public network, private network, and the like.

Cloud services can include an access gateway and/or enterprise services. The enterprise services 208 may include authentication services, threat detection services, device manager services, file sharing services, policy manager services, social integration services, application controller services, and the like. Authentication services may include user authentication services, device authentication services, application authentication services, data authentication services and the like. Authentication services may use certificates. The certificates may be stored on the client device, by the enterprise resources, and the like. The certificates stored on the client device may be stored in an encrypted location on the client device, the certificate may be temporarily stored on the client device for use at the time of authentication, and the like. Threat detection services may include intrusion detection services, unauthorized access attempt detection services, and the like. Unauthorized access attempt detection services may include unauthorized attempts to access devices, applications, data, and the like. Device management services may include configuration, provisioning, security, support, monitoring, reporting, and decommissioning services. File sharing services may include file management services, file storage services, file collaboration services, and the like. Policy manager services may include device policy manager services, application policy manager services, data policy manager services, and the like. Social integration services may include contact integration services, collaboration services, integration with social networks such as Facebook, Twitter, and LinkedIn, and the like. Application controller services may include management services, provisioning services, deployment services, assignment services, revocation services, wrapping services, and the like.

The enterprise mobility technical architecture of cloud services may include an application store. The application store may include unwrapped applications, pre-wrapped applications, and the like. Applications may be populated in the application store from the application controller. The application store may be accessed by the client device through the access gateway, through the public Internet, or the like. The application store may be provided with an intuitive and easy to use User Interface.

Figure 7:
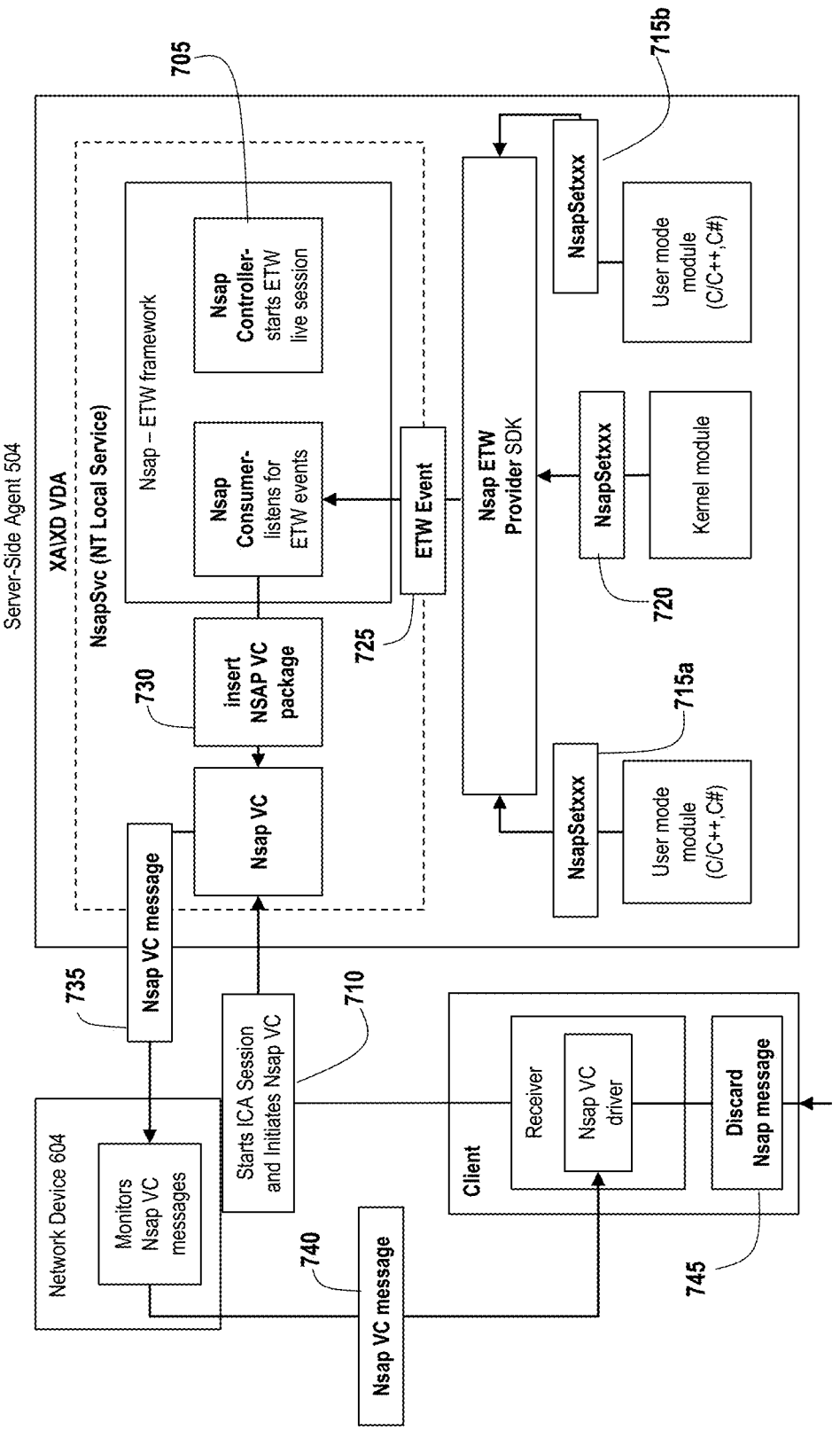
FIG. 7 is a block diagram of an embodiment of a system for App Flow data points collection and transmission, according to an illustrative embodiment.

Referring to FIG. 7, an example system that illustrates an implementation of App Flow 700 data points collection and transmission at a server (or server-side agent or VDA) is depicted. The system can include a client-side agent 502 (e.g., Citrix Receiver), a server-side agent 504 (e.g., XenApp/XenDesktop (XA/XD) VDA), and a network device 604 (e.g., NetScaler device). In connection with FIG. 7 for instance, NetScaler App Flow (NSAP) is sometimes also referred to as App Flow. Citrix NetScaler (or NetScaler) is referenced here by way of example, and can also be replaced with any type or form of network device. VDA is referenced here by way of example, and can also be replaced with any type or form of server-side agent 504. Likewise, Citrix Receiver (or Receiver) is referenced here by way of example, and can also be replaced with any type or form of client-side agent 502. The following is an example process flow, and can include some or all of the following operations:

At operation 705, after the VDA boots, the NSAP service on the VDA can instantiate an Event Tracing for Windows (ETW) Controller and can start an ETW live session. At operation 710, the Receiver can start an ICA session and a new NSAP driver can initiate the NSAP VC from the Receiver endpoint. The NSAP driver may discard all data coming on this NSAP VC, or it can use the statistics received. At operation 715a and 715b, user mode HDX components on the VDA can use the NSAP SDK (NsapSetxxx) to send data points to CtxNsapSvc. At operation 720, Kernel mode HDX components on the VDA can use the NSAP SDK (NsapSetxxx) to send data points to CtxNsapSvc. At operation 725, a CtxNsap provider library can send ETW events to the NSAP ETW Consumer hosted by CtxNsapSvc. At operation 730, the NSAP Service can encapsulate the data points (e.g., into a JSON format) and can send it to the NSAP virtual channel (or App Flow VC). At operation 735, NetScaler can intercept the NSAP VC message and can extract the required data. At operation 740, the message can further be transmitted to the Receiver along with all other HDX traffic. At operation 745, the Receiver NSAP VC driver may discard the NSAP VC message. In testing mode, the NSAP VC driver may parse the content and can display it in DebugView or in a file for test automation purposes. The NSAP VC driver may also interpret the data in non-testing mode.

Figure 8:
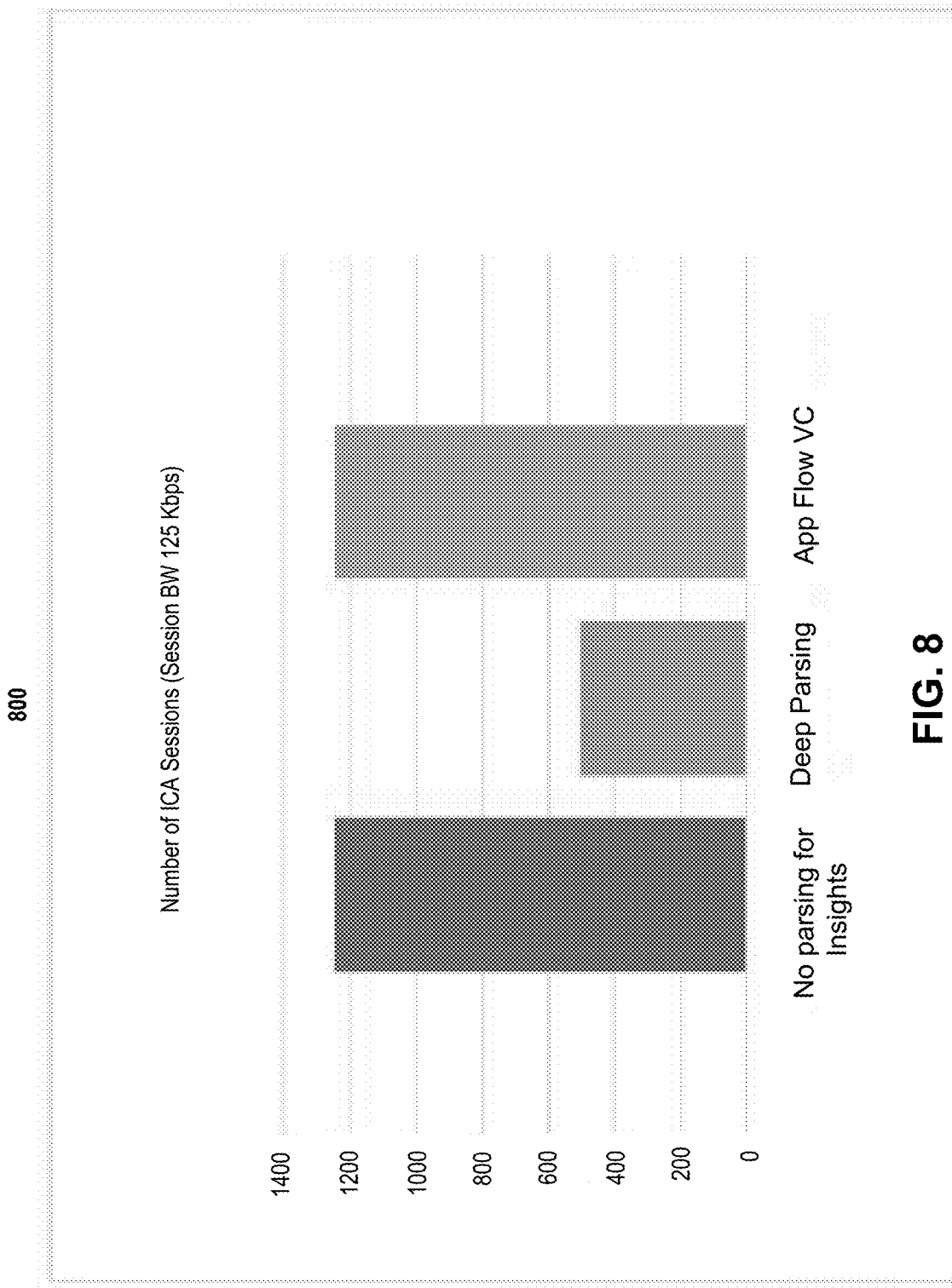
FIGS. 8-10 provides example charts comprising test results comparing implementations with and without using an App Flow virtual channel for insights, according to an illustrative embodiment.
Figure 9:
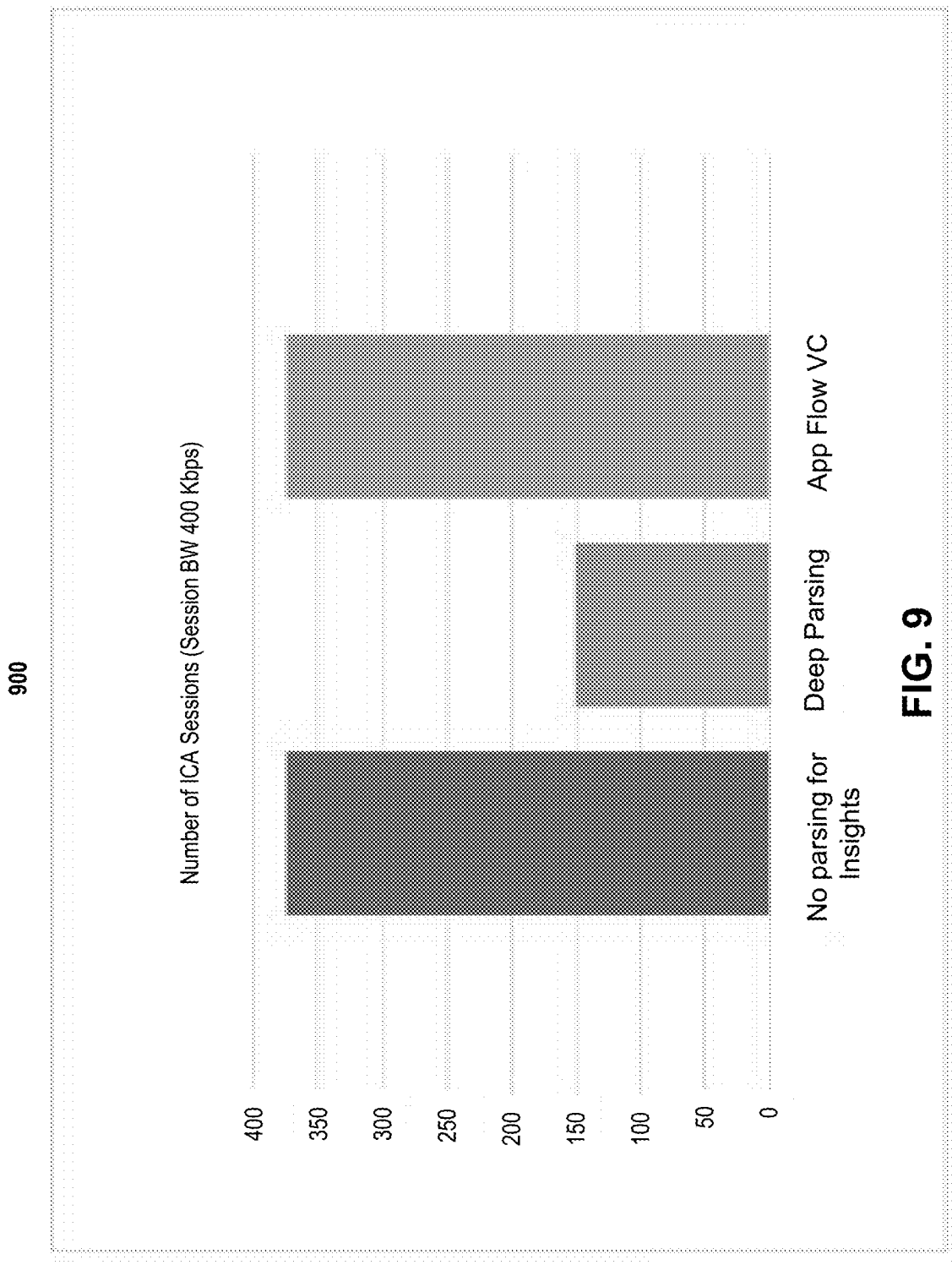
Figure 10:
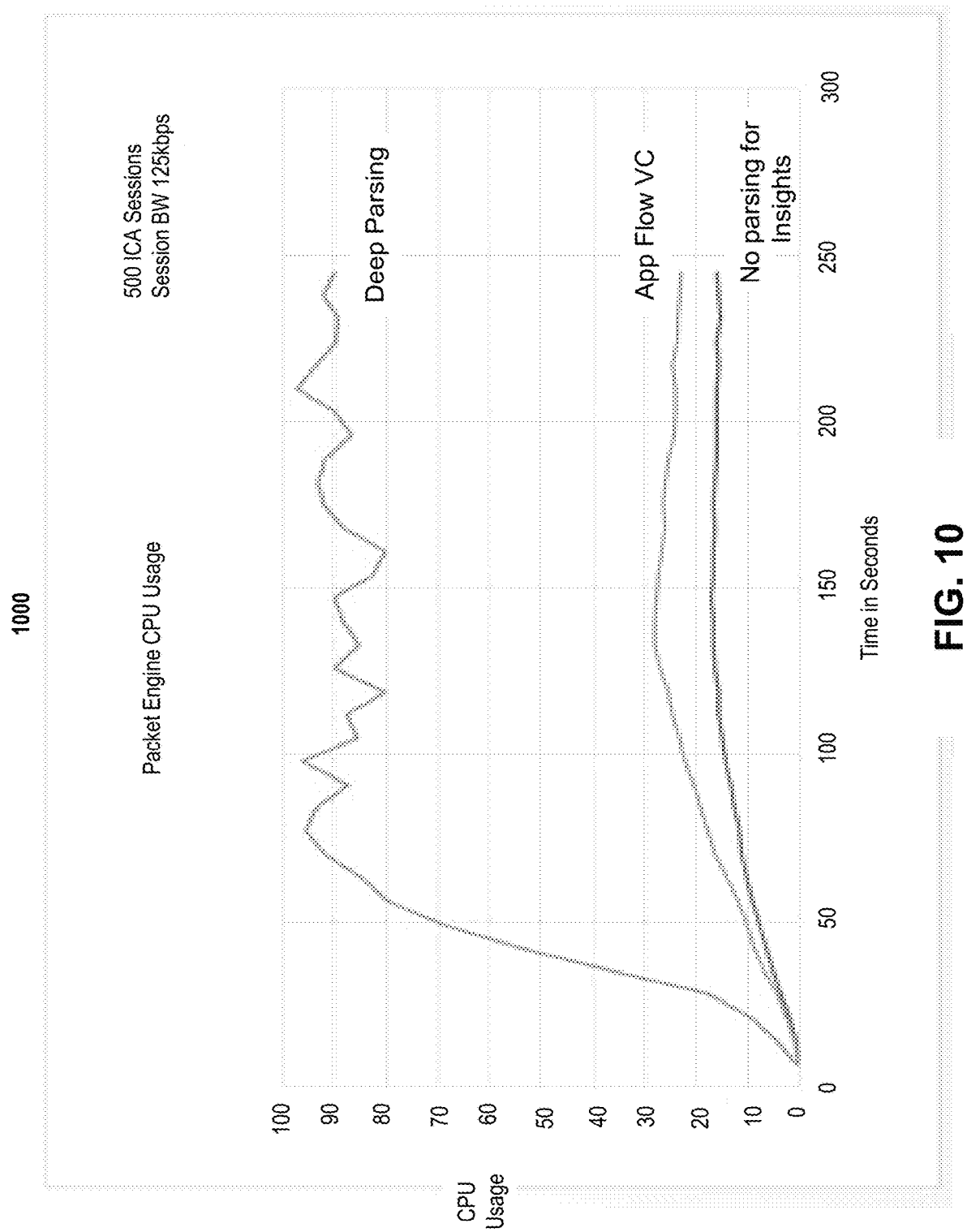

Referring to FIGS. 8-10, illustrative test results are provided including those from an implementation using an App Flow VC. The session bandwidth (BW) in each of FIGS. 8 and 9 can refer to HDX traffic load. FIG. 8 depicts a graph 800 of example test results on number of ICA/HDX sessions for a session bandwidth of 125 Kbps (e.g., typical workload). The test results, from left to right, show the case where no insights were parsed (when no App Flow VC is implemented), the case where deep-parsing is performed (when no App Flow VC is implemented), and the case where App Flow VC is implemented for efficient parsing. FIG. 9 depicts a graph 900 of example test results on number of ICA/HDX sessions for a session bandwidth of 400 Kbps (e.g., graphics rich workload). The test results, from left to right, show the case where no insights were parsed (when no App Flow VC is implemented), the case where deep-parsing is performed (when no App Flow VC is implemented), and the case where App Flow VC is implemented for efficient parsing. For each session bandwidth, the number of HDX sessions that can be served is about 2.5× higher with the App Flow VC based implementation, as compared with the deep parsing implementation. The actual difference is likely to be higher because of certain bottlenecks in the test setup. As discussed earlier, deep parsing is computationally and resource intensive, which reduces the number of HDX sessions that can be served. Even when the App Flow VC is used (and some computational resource is consumed for a more efficient parsing), the number of HDX sessions that can be served appear to be similar to the case where no insights were parsed.

FIG. 10 depicts a graph 1000 of example test results on network device CPU usage (e.g., Gateway appliance packet engine CPU usage). The test results show the case where no insights were parsed (when no App Flow VC is implemented), the case where deep-parsing is performed (when no App Flow VC is implemented), and the case where App Flow VC is implemented for efficient parsing. The CPU usage is shown under the condition that the number of sessions are maxed out. Sessions are considered maxed out when outgoing bandwidth goes down by 10% and user experience (UX) becomes sluggish. The test results show that when App Flow VC is used (and some computational resource is consumed for a more efficient parsing), the level of CPU usage (about 23%) is only slightly higher than that for case where no insights were parsed (about 15%). Hence, CPU usage under the App Flow VC based implementation is fairly low even when number of sessions are maxed out. However, in the case where deep-parsing is performed, the CPU usage (which is near 100%) is much higher than both of the other cases.

State Transition of App Flow Metrics during Network Appliance Failover (High-Availability)
State Transition via Shared State In some embodiments, a network device may be load-balanced, e.g., a Gateway may be load-balanced between Gateway instance 1 and Gateway instance 2. A specific HDX session may be initially established from client 1 via Gateway 1 to VDA host 1. An App Flow VC may have been established and data points may have been transmitted. ICA protocol-level encryption may have been negotiated and used, e.g., Basic or Secure ICA encryption. App Flow VC-specific protocol-level encryption may have been negotiated and used. A failure of Gateway 1 may cause the connection to be re-routed via Gateway 2. In another scenario, a network disruption may cause client 1 to re-establish transport level connection, which in turn may re-route the connection via Gateway 2, even without any failure at Gateway 1. In both of these cases the client 1 can reconnect to the host HDX session (e.g., using standard CGP Session Reliability mechanism).

In transitioning the App Flow state from Gateway 1 to Gateway 2, there can be a problem with continuing to re-interpret the protocol traffic, including decrypting ICA protocol-level encryption and/or App Flow protocol-level encryption, and identifying App Flow VC messages. Protocol state maintained by Gateway 1 can be continuously saved in shared storage, or at a globally available service, or a Remote Dictionary Server (Redis), etc. The protocol state may include, but is not limited to any one or more of the following: (a) App Flow VC negotiated capabilities: Session protocol version and flags, protocol version and flags for each entity; (b) App Flow VC protocol name to ID number association/binding; (c) Recorded App Flow VC version, events, data points; (d) Encryption method, keys, last encrypted byte at ICA protocol-level; and/or (e) Encryption method, keys, last encrypted byte at App Flow VC protocol-level.

Gateway 2 may retrieve and restore the shared protocol state from shared storage, identified by protocol-level identifier such as CGP cookie, Session GUID, etc. To continue parsing App Flow VC messages, Gateway 2 may for example perform any one or more of the following: (a) Re-synchronize transmitted and received packets at CGP-level; (b) Use last encrypted byte (at ICA protocol-level) to continue to decrypt ICA traffic and maintain encryption state; (c) Optionally, for optimization, use flags in CGP protocol to indicate presence of self-contained App Flow VC message; (d) If Gateway 2 can support the same Session capabilities as the already negotiated ones by Gateway 1: use last encrypted byte (at App Flow VC protocol-level) to continue to decrypt App Flow VC messages and maintain encryption state. Otherwise: Do not support App Flow VC; or clear protocol state and trigger re-negotiation of App Flow VC protocol capabilities as previously described. This may cause delay in processing but can ensure that App Flow functionality is still supported. Thus the App Flow state can be successful transitioned from Gateway 1 to Gateway 2, and Gateway 2 can continue to receive and interpret new events and data points.

State Transition via In-line State Re-initialization

In some scenarios, the protocol state may not be easily, efficiently or quickly shared between different Gateway instances. For example, for purposes of high-availability and resiliency redundant Gateway instances may reside on different cloud platforms, e.g., Microsoft Azure or Amazon AWS. For additional resiliency a redundant Gateway instance may exist in a co-location facility or on-premises. Therefore, as an alternative, the App Flow channel (or VC) may be designed as stateless or, rather, during failover the new Gateway instance may be re-initialized (or re-seeded) with sufficient state to continue parsing the App Flow data, where the re-initialization may be performed in-line via a tunneling protocol, e.g. CGP, or via the App Flow VC itself, or a combination. By way of a non-limiting example, the in-line state re-initialization process may occur as illustrated below:

A network device may be load-balanced, e.g. a Gateway may be load-balanced between Gateway instance 1 and Gateway instance 2. A specific HDX session may be initially established from client 1 via Gateway 1 to VDA host 1. An App Flow VC may have been established and data points may have been transmitted. As a result of determining that strong network-level encryption, e.g. with TLS or DTLS existing end-to-end, ICA protocol-level encryption, e.g. Basic or Secure ICA encryption, may be turned off. App Flow VC-specific protocol-level encryption may have been negotiated and used. A failure of Gateway 1 may cause the connection to be re-routed via Gateway 2. In another scenario, a network disruption may have caused client 1 to re-establish transport, which in turn might have re-routed the connection via Gateway 2, even without any failure at Gateway 1. In both of these cases the client could use the standard CGP Session Reliability mechanism to reconnect to the host HDX session.

When transitioning the App Flow state from Gateway 1 to Gateway 2, there can be a problem with continuing to re-interpret the protocol traffic, including App Flow protocol-level encryption, and identifying App Flow VC messages. In some embodiments, upon CGP reconnect, new CGP capability is exchanged. In client-to-host and/or host-to-client direction, the CGP capability carries sufficient data to allow Gateway 2 to identify the App Flow VC. This data can include the App Flow VC protocol name to ID number association/binding. Also upon CGP reconnect, the client and host can issue an event to their App Flow VC modules, which can instruct the App Flow VC itself to for instance (re)send one or more of the following: [1] App Flow VC negotiated capabilities: Session protocol version and flags, protocol version and flags for each entity. (Unencrypted. First data point sent); [2] Encryption method, keys, last encrypted byte at App Flow VC protocol-level (Unencrypted); [3] App Flow VC JSON protocol version; [4] Session GUID; [5] Additional data points may also be sent reflecting current HDX session state; and so on. The bulk of historical data points that do not require real-time synchronization could still be stored in a globally reachable or replicated MAS.

To continue parsing App Flow VC messages, Gateway 2 may for example perform one or more of the following: (a)

Re-synchronize transmitted and received packets at CGP-level; (b) Optionally, for optimization, use flags in CGP protocol to indicate presence of self-contained App Flow VC message; (c) Use the App Flow VC protocol name to ID number association/binding to start parsing the App Flow VC; (d) If Gateway 2 can support the same Session capabilities as the already negotiated ones by Gateway 1 (which can be a reasonable assumption for Cloud instances where capabilities can be kept uniform): i) Queue all App Flow VC packets, e.g. those previously CGP-buffered by client and/or host and now re-synchronized by CGP, until packets with unencrypted data points [1] and [2] above are received, ii) Use last encrypted byte (at App Flow VC protocol-level) to continue to decrypt App Flow VC messages and maintain encryption state, and iii) Interpret and flush the previously CGP-buffered data points, if any; (e) Otherwise (if Gateway 2 cannot support the same Session capabilities as the already negotiated ones by Gateway 1): i) Do not support App Flow VC, or ii) clear protocol state and trigger re-negotiation of App Flow VC protocol capabilities as previously described. This may cause delay in processing but can ensure that App Flow functionality is still supported. Thus the App Flow state can be successful transitioned from Gateway 1 to Gateway 2, and Gateway 2 continues to receive and interpret new events and data points.

Efficient Identification and Prioritization of Multi-Stream ICA (MSI) HDX Streams In multi-stream ICA (MSI), virtual channels may run on different MSI streams with priority 0-3. The streams with different priority can impart quality of service for the QoS for the virtual channels. In Multi-port ICA, separate ports have to be configured on the server-side agent 504 (e.g. VDA). A network device, referenced here as SD-WAN by way of illustration, can support MSI without multiple ports by deep parsing CGP and ICA. The SD-WAN can perform compression, which can offload ICA reducer, printing compression, etc., and include cross-session caching and compression.

Figure 11:
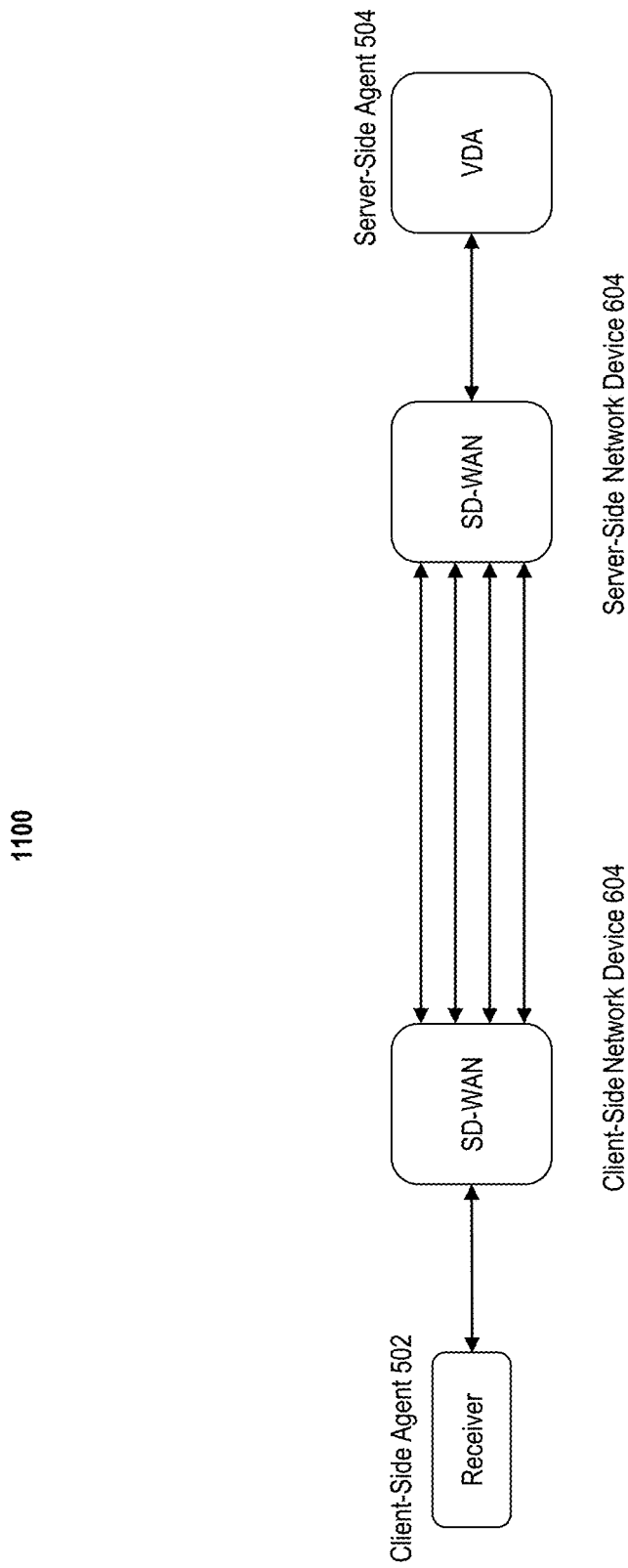
FIG. 11 is a block diagram of an embodiment of a system for providing Multi-stream ICA (MSI) between client-side and server-side network devices, according to illustrative embodiments.

An example representation of MSI using such client-side and server-side network devices is shown in FIG. 11. Although there can be any number of MSI streams, the embodiment shown and discussed herein provides for 4 MSI streams by way of illustration: 1 primary stream, which handles the core ICA protocol and some VCs, and 3 secondary streams, which handle additional VCs. In some embodiments, App Flow VC messages are sent on the primary MSI stream, so a network device can parse only the primary stream to access insights from these messages in the App Flow VC. App Flow VC messages can also be sent on any other pre-determined MSI stream, as long as the network device can know or determine which stream to access the insights. To enable identification of the separate streams, their type and priority, stream-identifying data points can be initially sent on all MSI streams, e.g. the one primary MSI stream and three secondary MSI streams, as soon as each stream is created for instance. The stream-identifying data points can include at least one of, but may not be limited to: (a) Session GUID; (b) Stream ID; (c) Priority; or (d) Stream type: Primary vs. Secondary. For example, Citrix SD-WAN can use the priority to prioritize HDX traffic accordingly.

During the lifetime of an HDX session, the priority of individual VCs may change and they may be re-assigned to different streams. This has no impact on the App Flow processing, since the App Flow VC may always be processed on a predetermined (e.g., primary) stream. However, the priority of individual streams may also change, in which case stream-identifying data points may be sent again to indicate the change of priority. In some embodiments, a VC write operation may normally send the data point only on the dedicated stream associated with a VC, e.g. the primary stream in case of the App Flow VC. But in the case of an App Flow implementation, a modified VC write operation can be used to send each stream-identifying data point on the respective stream, to enable a network device to identify the separate streams, their type and current priority.

L7 Latency Calculation and Communication Independent of Server (Host) Processing Time In some embodiments, ICA/HDX protocol determines Round Trip Time (RTT) using measurement semantics that are different from a level 7 (L7) latency measurement. The ICA/HDX RRT use semantics that are geared towards user experience (UX) or application response time. The ICA RTT calculation is based on a server's response to a client's query. The server's response is sent on the next outgoing packet. However, if an application does not update, e.g. a desktop application is idle, there is no other server-to-client traffic. Hence, the next outgoing packet could be indefinitely delayed, resulting in a measurement that may not be useful.

An App Flow VC monitoring network device (such as NetScaler Gateway or SD-WAN) may also be interested in reporting the end-to-end network latency at Layer 7 of the OSI model between the monitoring network device and the server (e.g., HDX host). This can be an important or useful data point which reflects the network conditions between the monitoring network device and the server, and can also be combined with additional measurements of the network conditions between the end-point and the monitoring appliance for instance. In some embodiments, the network device can calculate the L7 latency accurately by measuring the time taken for a token, referred to as NsRTT (e.g., NetScaler Round Trip Token) leaving the network device and returning back. The carrier channel that brings back the NsRTT from the server includes Server Processing Time (SPT), which can be deducted from the total time, to obtain the actual "network device to server" L7 latency.

Figure 12:
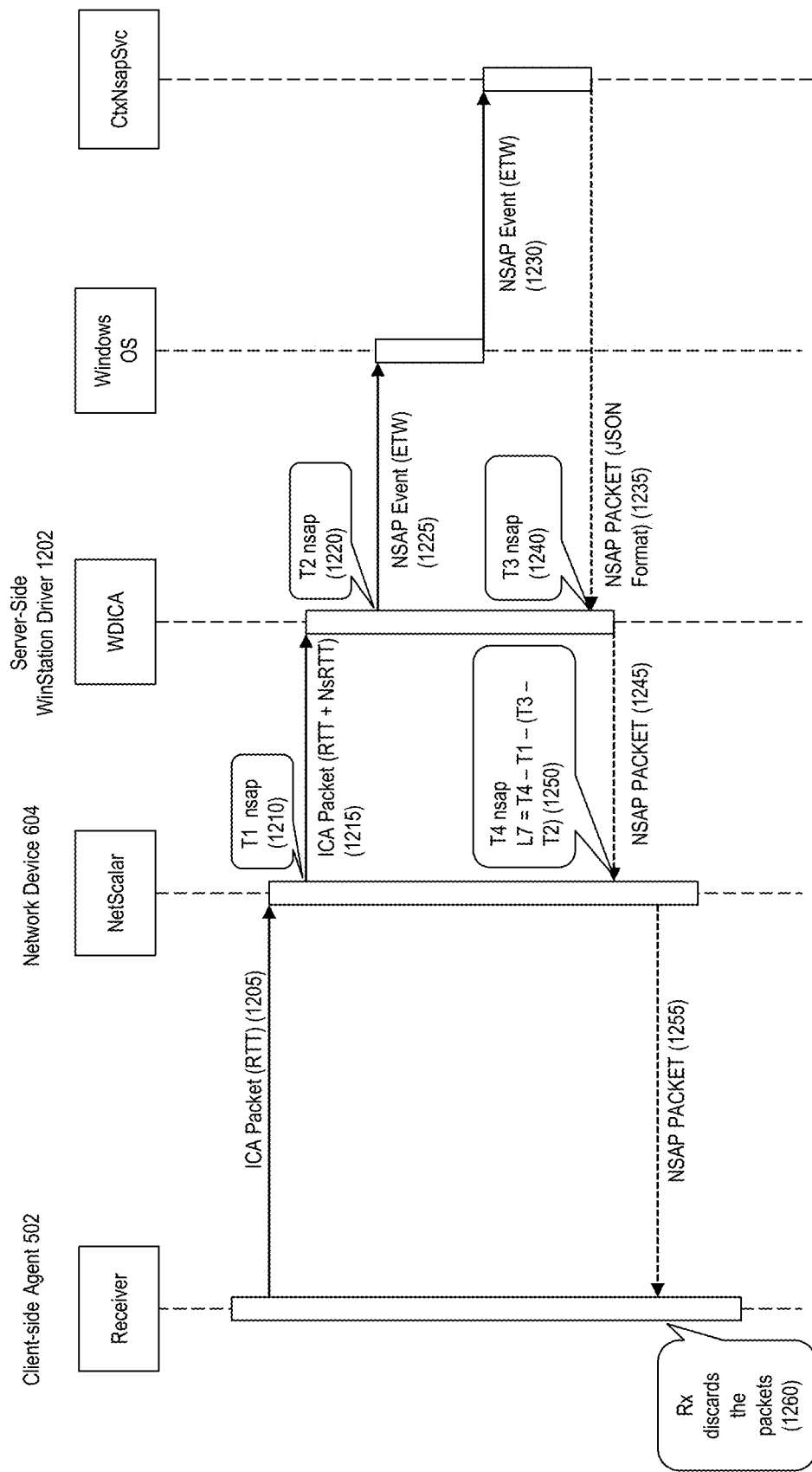
FIG. 12 is a diagram illustrating a method for calculating latency independent of server processing time, according to illustrative embodiments.

Calculating the Server Processing Time accurately can be very intricate by virtue of the complex modules and systems involved. One novel aspect lies in the way the system propagates information (timestamp) between the discrete system components and then assimilates it back. As illustrated in FIG. 12, the network device 604 can receive an ICA packet in an ICA stream (1205) from the receiver (e.g., the client-side agent 502). The network device 604 can take a timestamp T1 (1210) and insert a NsRTT token in the ICA stream to the server (1215). The server-side WinStation Driver 1202 (sometimes referred to as WDICA) can receive the NsRTT token, can take a timestamp T2 (1220), can record it (e.g., in the Windows Event, using Event Tracing for Windows (ETW) for instance), and can fire the event (1225), which then goes into the Windows OS queue and later gets delivered to the Citrix App Flow Service (CtxNsapSvc), for processing (1230). The time it takes for the ETW to reach CtxNsapSvc can be indeterministic.

The CtxNsapSvc, after receiving the ETW, can constructs a payload (e.g., JSON payload), and can dispatch it in an App Flow packet (1235). The payload can include the T2 timestamp previously communicated via the event. Then, the WDICA, which is at a lower layer of the ICA stack and essentially only one layer above the network transport module, can recalibrate, adjust, provide and/or update the SPT content in the JSON payload by calculating the true SPT (T3-T2), where T3 is a current timestamp taken by WDICA (e.g., the server-side WinStation Driver 1202) upon receiving the payload or App Flow packet (1240). The WDICA can write the true SPT in a field of the payload (e.g., JSON payload), and set the packet on flight to the network device (1245). The network device 604, responsive to receiving the payload, can take timestamp T4 and measure the true L7 latency using the SPT. The true L7 latency is equal to T4-T1-(T3-T2) (1250). The network device 604 can send an NSAP packet to the receiver (1255), and the receiver can discard the packets (1260).

L7 Latency Calculation and Communication between Multiple Network Devices

The App Flow VC capability described in connection with FIG. 6 may be extended to include an additional field, where each entity (network device or client) may set a previously unused bit as the App Flow VC capability travels from the server to the client (e.g., in an ICA init-request packet). The bit (or field) can be used to uniquely identify each entity. Each entity can record the bit it uses as an Entity ID bit, and can set it in the App Flow VC capability so that it does not get used by other downstream entities.

When a network device inserts an NsRTT token in the ICA stream, the network device can also update or decorate the token with its corresponding Entity ID bit. As the NsRTT token travels in the client-to-server direction, the NsRTT token may also be reused by other network devices in the path by each adding/setting its corresponding Entity ID bit.

The SPT computation and the creation of L7 latency App Flow data point at the server can proceed as described above, except that the server can insert the combined Entity ID bits in the L7 latency App Flow data point. Each network device in the path can interpret the L7 latency App Flow data point as described above, except that the network device can ignore the data point unless it has its specific assigned Entity ID bit set.

Figure 13:
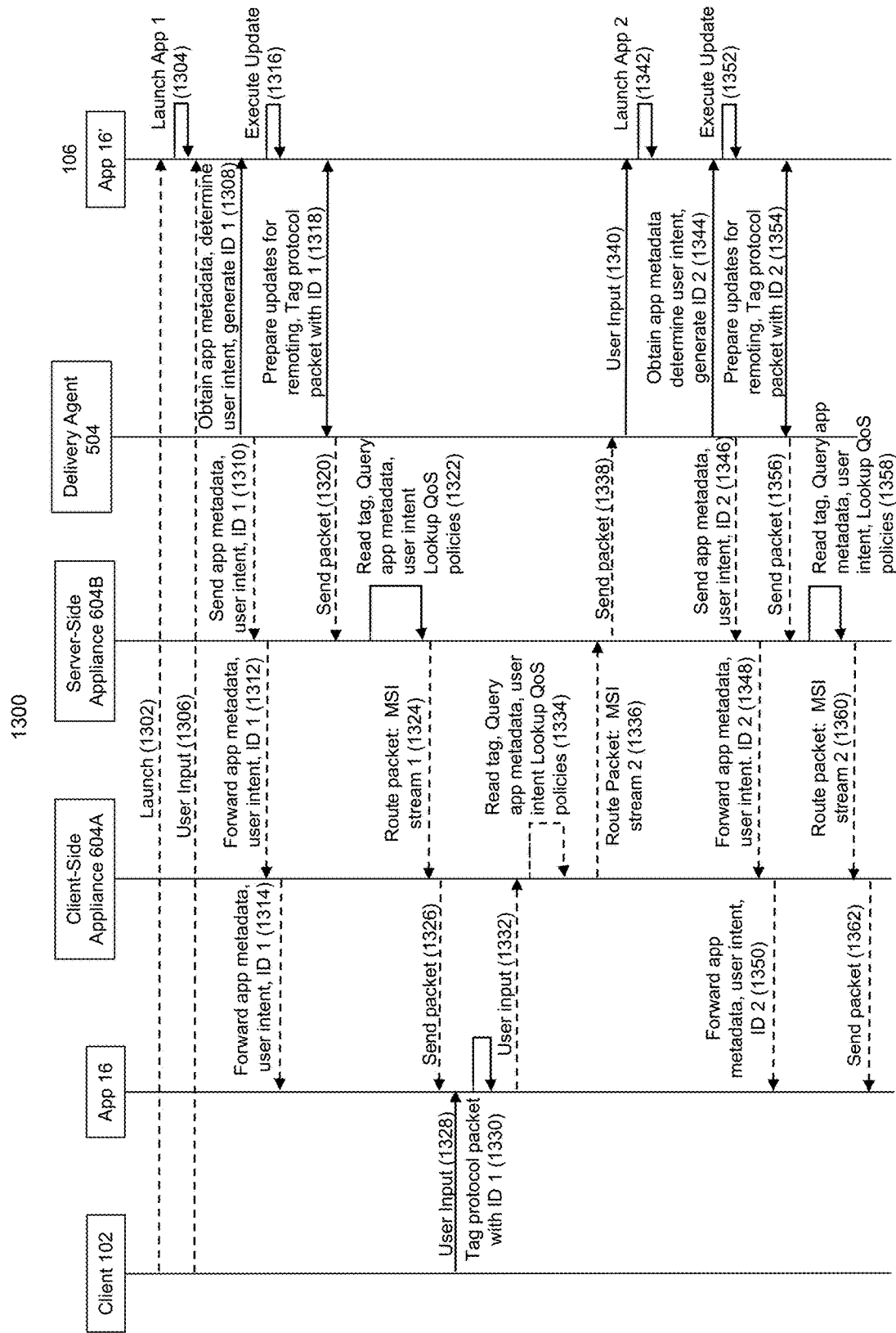
FIG. 13 is a sequence diagram illustrating a process for optimizing virtual application delivery via intermediary devices, according to illustrative embodiments.

F. Systems and Methods for Managing Network Resources for Delivery of Virtual Applications and Desktops Managing Streams of Packets via Intermediary Devices Referring now to FIG. 13, depicted is a sequence diagram illustrating a process 1300 for optimizing virtual application delivery via intermediary devices. The process 1300 may be performed using at least one client 102 executing at least one application 16 (e.g., workspace application), at least one client-side appliance 604A (e.g., client-side SD-WAN device), at least one server-side appliance 604B (e.g., server-side SD-WAN device), at least one delivery agent 504 (e.g., a VDA), and at least one server 106 hosting an application 16' (or network application), among other components as detailed herein above in Sections A-E. For example, the client-side appliance 604A and the server-side appliance 604B may be an instance of the network device 604, and may each support a set of virtual channels for communications between the client 102 and the server 106, among others components.

The client 102 may request to launch the application 16 to access the application 16' hosted on the server 106 (1302). The application 16' (e.g., a network application such as a virtual application, virtual desktop, SaaS application, or web application) hosted on the server 106 may be accessed on the client 120 via the application 16 on the client 102. The application 16' may include a single program or a set of programs accessible via a remote desktop. The application 16 (also referred herein as a workspace application) may be an agent executing on the client 102 for accessing the application 16' hosted on the server 106. To launch, the application 16 running on the client 102 may generate and send a request for the application 16' hosted on the server 106.

In response, the server 106 may launch the application 16' hosted thereon to provide access (1304). The server 106 may receive the request for the application 16' from the client 102. Upon receipt of the request, the server 106 may commence execution of the application 16' to remotely provision or deliver to the application 16 running on the client 102. In some embodiments, the server 106 may identify a previously instantiated application 16' to provision to the application 16 running on the client 102. The server 106 may provide access of the application 16' to the client 102 using a set of virtual channels established between the client 102 and the server 106 through the client-side appliance 604A and the server-side appliance 604B. Each virtual channel may communicate a stream of packets between the application 16' running on the server 106 and the application 16 running on the client 102.

With access to the application 16', the client 102 may provide user input to the server 106 (1306). The user input may include one or more user interaction events with the application 16'. In some embodiments, the application 16 on client 102 may maintain and run an event listener (e.g., an asynchronous function call in response to a user interaction with an input/output device or an element of a graphical user interface) to monitor for a user interaction event. The user interaction event may include, for example, user input through an input/output device, such as a hover over, a click, a scroll, a touch screen, a keypress. The user interaction may include an activation of a user interface element of a graphical user interface of the application 16' accessed via the application 16 on the client 102. Upon detecting the user interaction event, the application 16 running on the client 102 may send the user input to the application 16' running on the server 106. In some embodiments, the application 16 running on the client 102 may send the user input via one or more of the virtual channels between the client 102 and the server 106 to the application 16' running on the server 106.

The delivery agent 504 may obtain application metadata on the application 16' from the server 106 (e.g., from the delivery agent) (1308). The application metadata may include any information regarding the application 16' hosted on the server 106. The application metadata may include, for example: an application identifier (e.g., a published application name), an application type (e.g., a word processor, a web browser, or a media player), a window or process identifier, a window hierarchy, a user element in focus, a network address (e.g., a Uniform Resource Locator (URL) and an Internet Protocol (IP) address), an account identifier associated with the user operating the application 16 or 16', a device identifier corresponding to the client 102. The application metadata may also include interaction data indicative of user interaction events with the application 16' accessed via the application 16 on the client 102. The interaction data may include, for example, an activation of a user interface element, an event notification, user input through an input/output (IO) device, or a URL (e.g., a hyperlink) accessed by the user on the application 16', among others.

In some embodiments, the delivery agent 504 may obtain the application metadata from the server 106 hosting the application 16'. In some embodiments, the delivery agent 504 may reside along a data path in one or more networks between the client 102 and the server 106, and may intercept the application metadata from communications via the data path. The obtaining of the application metadata including the interaction data may be in accordance with an API (e.g., Microsoft UI Automation API) used by the application 16 and 16'. In some embodiments, the delivery agent 504 may obtain the application metadata from the client 102 accessing the application 16' via the application 16. For example, the application 16 may register event notification and request specific properties and control pattern information. In some embodiments, the delivery agent 504 may obtain the application metadata via a cloud service or another network device. The cloud service may include cloud-based resources associated with the application 16' hosted on the server 106. In some embodiments, the delivery agent 504 may use virtual window tracking to identify the user element in focus and the window hierarchy. In some embodiments, the delivery agent 504 may use process monitoring to identify the user element and the window hierarchy. In some embodiments, the delivery agent 504 may for instance obtain the interaction data in accordance with the API used by the application 16 and 16' to enumerate the window hierarchy and identify the user element in focus.

The delivery agent 504 may send the application metadata and/or user interaction (or user intent) metadata (hereafter sometimes generally or collectively referred to as "application metadata") to the server-side appliance 604B (1310). In some embodiments, the application metadata may be sent by the delivery agent 504 indirectly to the application 16 via the server-side appliance 604B and the client side appliance 604A. Once obtained, the delivery agent 504 may provide the application metadata to the server-side appliance 604B. In some embodiments, the delivery agent 605 may send the application metadata to the server-side appliance 604B via a virtual channel separate from the set of virtual channels for communicating streams of packets for the application 16 and 16'. The separate virtual channel (sometimes referred herein as out-of-band) may be established between the server-side appliance 604B and the delivery agent 504. In some embodiments, the server-side appliance 604B may obtain the application metadata via a cloud service or another network device. The cloud service may be a cloud-based resource associated with the application 16' hosted on the server 106.

The server-side appliance 604B may forward the application metadata to the client-side appliance 604A (1312). In some embodiments, the server-side appliance 604B may send the application metadata via a virtual channel separate from the set of virtual channels for communicating streams of packets for the application 16 and 16'. The separate virtual channel (sometimes referred herein as out-of-band) may be established between the client-side appliance 604A and the server-side appliance 604B. The client-side appliance 604A may receive the application metadata. In some embodiments, the application metadata may be sent by the delivery agent 504 directly to the client-side appliance 604A via the separate virtual channel. The separate virtual channel (sometimes referred herein as out-of-band) may be established between the client-side appliance 604A and the delivery agent 504. In some embodiments, the client-side appliance 604A and the delivery agent 504 may establish the separate virtual channel via an authentication protocol. In some embodiments, the client-side appliance 604A may obtain the application metadata via a cloud service or another network device. The cloud service may be a cloud-based resources associated with the application 16' hosted on the server 106. The client-side appliance 604A may forward the application metadata to the application 16 on the client 102 (1314).

Subsequently, the server 106 may execute an update on the application 16' (1316). The update on the application 16' may correspond to any change detected in connection with the application 16' (e.g., including user intent or interaction). For example, the server 106 may execute a process of the application 16' thereby changing execution of the application 16' in response to the user input received via the application 16 from the client 102. In some embodiments, the update of the application 16' may correspond to a change to the set of instructions (e.g., software) underlying the application 16'. In some embodiments, the update of the application 16' may correspond to a change in the application metadata (e.g., addition of interaction data).

The delivery agent 504 may tag, assign, or otherwise add a packet with the application identifier (1318). In some embodiments, the delivery agent 504 may access, receive, or otherwise identify the packet to be streamed from the application 16' hosted on the server 106. The packet may be generated in accordance with any number of communications protocols, such as a transport layer security (TLS) or datagram transport layer security (DTLS), among others. In some embodiments, the packet may have a header and a body in accordance with the communications protocol for the packet. The header may include an identifier associated with at least a portion of the application metadata for the application 16'. For example, the header of the packet may include the application identifier and user interactions. In some embodiments, the header may include an identifier associated with the portion of the application metadata. The identifier may be a set of alphanumeric characters uniquely identifying the portion of the application metadata included in the header of the packet. In some embodiments, the delivery agent 504 may identify a specific portion of the application metadata. The delivery agent 504 may generate the identifier for the portion of the application metadata. The delivery agent 504 may insert the identifier into the header of the packet. In some embodiments, the delivery agent 504 may include the identifier into the header of a TLS or DTLS packet with a clear-text extension. In some embodiments, the delivery agent 504 may tag the packet to specify a tunneling protocol (e.g., bits in a gateway protocol header). In some embodiments, the delivery agent 504 may tag the packet a network address (e.g., a combination of IP address and port number). In some embodiments, the delivery agent 504 may tag the packet with an anonymity tag to hide identifying information (e.g., the combination of IP address and port number). Once generated, the delivery agent 504 may send the packet to the server-side appliance 604B (1320).

The server-side appliance 604B may parse or otherwise inspect the packet for identifying a policy (1322). The server-side appliance 604B may receive the packet from the delivery agent 504. Upon receipt, the server-side appliance 604B may parse the packet to identify the header and/or the body. From the header, the server-side appliance 604B may obtain the identifier for identifying the relevant portion of the application metadata. In accordance with the relevant portion of the application metadata, the server-side appliance 604B may select or identify a policy to apply to the packets to be streamed. In some embodiments, the policy may specify quality of service (QoS) configuration (e.g., a range for packet loss, bit rate, throughput, delay, and jitter). The QoS configuration of the policy may set a range of bandwidth used for streaming the packets between the client 102 and the server 106 for accessing the application 16'. For example, for a user typing, actively scrolling, and reading in a word processing application as indicated in the metadata, the policy may specify use of a low-latency link and forward error correction. In contrast, for a user watching a video in a browser or transferring files in an explorer, the policy may specify use of a high-bandwidth link for bulk transfer. In some embodiments, the policy may specify a set of access control rules (e.g., firewall). The policy may specify the QoS configuration or access control depending on the application metadata contained in the header of the packet.

Upon identifying the policy, the server-side appliance 604B may apply the policy to the packets to be streamed to the client 102. In applying the policy according to the portion of the application metadata, the server-side appliance 604B may determine network resources to allocate to at least one of the streams of packets. The network resources allocated to one or more of the streams of packets may include a bandwidth, a bandwidth limit, a latency range, permitted jitter, use of a different transmission mode (e.g., a more bandwidth efficient or a more lossy mode), or a data transmission rate (throughput), among others. For example, the server-side appliance 604B may set the network resources to the rates indicated by the QoS specifications of the selected policy. By allocating the network resources in accordance to the policy, the server-side appliance 604B may provide the target QoS to the streams of packets between the client-side appliance 604A and the server-side appliance 604B.

The server-side appliance 604B may route or send the packet in a stream (1324). The server-side appliance 604B may send the packet in the stream to the client-side appliance 604A. The stream may correspond to one of the set of virtual channels established between the client-side appliance 604A and the server-side appliance 604B. In some embodiments, the server-side appliance 604B may control the routing of the packet in accordance to the network resources allocated to the stream in which the packet is to be communicated. The client-side appliance 604A may send the packet in the stream to the application 16 on the client 102 (1326). The client-side appliance 604A may receive the stream of packets from one of the set of virtual channels established between the client-side appliance 604A and the server-side appliance 604B.

The application 16 running on the client 102 may receive a user input (1328). The user input may include one or more user interaction events with the application 16'. In some embodiments, the application 16 on client 102 may maintain and run an event listener to monitor for a user interaction event. The user interaction event may include, for example, user input through an input/output device, such as a hover over, a click, a scroll, a touch screen, a keypress. The user interaction may include an activation of a user interface element of a graphical user interface of the application 16' accessed via the application 16 on the client 102. Upon detecting the user interaction event, the application 16 running on the client 102 may send the user input to the application 16' running on the server 106. In some embodiments, the application 16 running on the client 102 may send the user input via one or more of the virtual channels between the client 102 and the server 106 to the application 16' running on the server 106.

The application 16 may tag, assign, or otherwise add a packet with the application metadata (1330). The application metadata may include activity (e.g., user interactions) at the client 102 with respect to the application 16' accessed via the application 16. In some embodiments, the application 16 may access, receive, or otherwise identify the packet to be streamed from the application 16' hosted on the server 106. The packet may be in generated in accordance with any number of communications protocols, such as a transport layer security (TLS) or datagram transport layer security (DTLS), among others. In some embodiments, the packet may have a header and/or a body in accordance with the communications protocol for the packet. The header may include an identifier or tag for identifying at least a relevant portion of the application metadata for the application 16'. The identifier may be a set of alphanumeric characters uniquely identifying the portion of the application metadata included in the header of the packet. In some embodiments, the application 16 may identify the portion of the application metadata relevant to managing network resources for the packet (or its virtual channel). The application 16 may generate the identifier for the portion of the application metadata. The application 16 may insert the identifier into the header of the packet. In some embodiments, the application 16 may include the identifier into the header of a TLS or DTLS packet with a clear-text extension. In some embodiments, the application 16 may tag the packet to specify a tunneling protocol (e.g., bits in a gateway protocol header). In some embodiments, the application 16 may tag the packet a network address (e.g., a combination of IP address and port number). In some embodiments, the application 16 may tag the packet with an anonymity tag to hide identifying information (e.g., the combination of IP address and port number).

The application metadata may include any information regarding the application 16' hosted on the server 106, and regarding user intent or interaction. The application metadata may include, for example: an application identifier (e.g., a published application name), an application type (e.g., a word processor, a web browser, or a media player), a window or process identifier, a window hierarchy, a user element in focus, a network address (e.g., a Uniform Resource Locator (URL) and an Internet Protocol (IP) address), an account identifier associated with the user operating the application 16 or 16', a device identifier corresponding to the client 102. The application metadata may also include interaction data indicative user interaction events with the application 16' accessed via the application 16 on the client 102. The interaction data may include, for example, an activation of a user interface element, an event notification, user input through an input/output (TO) device, or a URL (e.g., a hyperlink) accessed by the user on the application 16', among others. Once generated, the application 16 may send the user input to the client-side appliance 604A (1332). The application 16 running on the client 102 may send the user input as metadata via one of the virtual channels or via other means described herein.

The client-side appliance 604A may parse the packet for identifying a policy (1334). The client-side appliance 604A may receive the packet from the application 16. Upon receipt, the client-side appliance 604A may parse the packet to identify the header and/or the body. From the header, the client-side appliance 604A may obtain the identifier for identifying the portion of the application metadata relevant to the packet (or its virtual channel). In accordance with the identified portion of the application metadata, the client-side appliance 604A may select or identify a policy to apply to the packets to be streamed. In some embodiments, the policy may specify quality of service (QoS) configuration (e.g., network resources to allocate, and/or an acceptable range for packet loss, bit rate, throughput, delay, and jitter). The QoS configuration of the policy may set a range of bandwidth used for streaming the packets between the client 102 and the server 106 for accessing the application 16'. For example, for a user typing, actively scrolling, and reading in a word processing application as indicated in the metadata, the policy may specify use of a low-latency link and forward error correction. In contrast, for a user watching a video in a browser or transferring files in an explorer, the policy may specify use of a high-bandwidth link for bulk transfer. In some embodiments, the policy may specify a set of access control rules (e.g., firewall). The policy may specify the QoS configuration or access control depending on the application metadata contained in the header of the packet.

Upon identifying the policy, the client-side appliance 604A may apply the policy to the packets to be streamed to the client 102. In applying the policy according to the portion of the application metadata, the client-side appliance 604A may determine network resources to allocate to at least one of the streams of packets. The network resources allocated to one or more of the streams of packets may include a bandwidth, a bandwidth limit, a latency range, permitted jitter, or a data transmission rate (throughput), among others. For example, the client-side appliance 604A may set the network resources to the rates indicated by the QoS specifications of the selected policy. By allocating the network resources in accordance to the policy, the client-side appliance 604A may provide the target QoS to the streams of packets between the client-side appliance 604A and the server-side appliance 604B.

The client-side appliance 604A may route the packet in a stream (1336). The client-side appliance 604A may send the packet in the stream to the server-side appliance 604B. The stream may correspond to one of the set of virtual channels established between the client-side appliance 604A and the server-side appliance 604B. In some embodiments, the client-side appliance 604A may control the routing of the packet in accordance to the network resources allocated to the stream in which the packet is to be communicated. The server-side appliance 604B may send the packet to the delivery agent 504 (1338). The delivery agent 504 may forward user input to the application 16' executing on the server 106 (1340).

The server 106 may launch the application 16' (1342). In some embodiments, the server 106 may launch a different application 16' as previously in the process 1300. Upon receipt of the packet, the server 106 may commence execution of the application 16' to provide to the application 16 running on the client 102. In some embodiments, the server 106 may identify a previously instantiated application 16' to provision to the application 16 (e.g., workspace application) running on the client 102. The server 106 may provide access of the application 16' to the client 102 using a set of virtual channels established between the client 102 and the server 106 through the client-side appliance 604A and the server-side appliance 604B. Each virtual channel may communicate a stream of packets between the application 16' running on the server 106 and the application 16 running on the client 102. The set of virtual channels established for the new application 16' may differ from the set of virtual channels for the previous application 16'.

The delivery agent 504 may obtain application metadata on the application 16' from the server 106 (1344). The application metadata may include any information regarding the application 16' hosted on the server 106. The application metadata may include, for example: an application identifier (e.g., a published application name), an application type (e.g., a word processor, a web browser, or a media player), a window or process identifier, a window hierarchy, a user element in focus, a network address (e.g., a Uniform Resource Locator (URL) and an Internet Protocol (IP) address), an account identifier associated with the user operating the application 16 or 16', a device identifier corresponding to the client 102. The application metadata may also include interaction data indicative user interaction events with the application 16' accessed via the application 16 on the client 102. The interaction data may include, for example, an activation of a user interface element, an event notification, user input through an input/output (IO) device, or a URL (e.g., a hyperlink) accessed by the user on the application 16', among others. In some embodiments, the delivery agent 504 may obtain the application metadata from the server 106 hosting the application 16'. In some embodiments, the delivery agent 504 may reside along a data path in one or more networks between the client 102 and the server 106, and may intercept the application metadata from communications via the data path. In some embodiments, the delivery agent 504 may obtain the application metadata from the client 102 accessing the application 16' via the application 16. In some embodiments, the delivery agent 504 may obtain the application metadata via a cloud service or another network device. The cloud service may include a cloud-based resource associated with the application 16' hosted on the server 106.

The delivery agent 504 may send the application metadata to the server-side appliance 604B (1346). In some embodiments, the application metadata may be sent by the delivery agent 504 indirectly to the application 16 via the server-side appliance 604B and the client side appliance 604A. Once obtained, the delivery agent 504 may provide the application metadata to the server-side appliance 604B. In some embodiments, the delivery agent 605 may send the application metadata to the server-side appliance 604B via a virtual channel separate from the set of virtual channels for communicating streams of packets for the application 16 and 16'. The separate virtual channel (sometimes referred herein as out-of-band) may be established between the server-side appliance 604B and the delivery agent 504. In some embodiments, the server-side appliance 604B may obtain the application metadata via a cloud service or another network device. The cloud service may be a cloud-based resource associated with the application 16' hosted on the server 106.

The server-side appliance 604B may forward the application metadata to the client-side appliance 604A (1348). In some embodiments, the server-side appliance 604B may send the application metadata via a virtual channel separate from the set of virtual channels for communicating streams of packets for the application 16 and 16'. The separate virtual channel (sometimes referred herein as out-of-band) may be established between the client-side appliance 604A and the server-side appliance 604B. The client-side appliance 604A may receive the application metadata. In some embodiments, the application metadata may be sent by the delivery agent 504 directly to the client-side appliance 604A via the separate virtual channel. The separate virtual channel (sometimes referred herein as out-of-band) may be established between the client-side appliance 604A and the delivery agent 504. In some embodiments, the client-side appliance 604A and the delivery agent 504 may establish the separate virtual channel via an authentication protocol. In some embodiments, the client-side appliance 604A may obtain the application metadata via a cloud service or another network device. The cloud service may be a cloud-based resource associated with the application 16' hosted on the server 106. The client-side appliance 600A may forward the application metadata to the application 16 on the client 102 (1350).

Subsequently, the server 106 may update the application 16' (1352). The update on the application 16' may correspond to any change on the application 16', or in user intent or interaction. For example, the server 106 may execute a process of the application 16' thereby changing execution of the application 16' in response to the user input received via the application 16 from the client 102. In some embodiments, the update of the application 16' may correspond to a change to the set of instructions (e.g., software) underlying the application 16'. In some embodiments, the update of the application 16' may correspond to a change in the application metadata (e.g., addition of interaction data).

The delivery agent 504 may tag, assign, or otherwise add a packet with the application identifier (1354). In some embodiments, the delivery agent 504 may access, receive, or otherwise identify the packet to be streamed from the application 16' hosted on the server 106. The packet may be generated in accordance with any number of communications protocols, such as a transport layer security (TLS) or datagram transport layer security (DTLS), among others. In some embodiments, the packet may have a header and a body in accordance with the communications protocol for the packet. The header may include an identifier or tag for identifying at least a relevant portion of the application metadata. The identifier may be a set of alphanumeric characters uniquely identifying the portion of the application metadata relevant to the packet (or its virtual channel). In some embodiments, the delivery agent 504 may identify the portion of the application metadata to be identified by the identifier in the header of the packet. The delivery agent 504 may generate the identifier for the portion of the application metadata. The delivery agent 504 may insert the identifier into the header of the packet. In some embodiments, the delivery agent 504 may include the identifier into the header of a TLS or DTLS packet with a clear-text extension. In some embodiments, the delivery agent 504 may tag the packet to specify a tunneling protocol (e.g., bits in a gateway protocol header). In some embodiments, the delivery agent 504 may tag the packet a network address (e.g., a combination of IP address and port number). In some embodiments, the delivery agent 504 may tag the packet with an anonymity tag to hide identifying information (e.g., the combination of IP address and port number). Once generated, the delivery agent 504 may send the packet to the server-side appliance 604B (1356).

The server-side appliance 604B may parse the packet for identifying a policy (1358). The server-side appliance 604B may receive the packet from the delivery agent 504. Upon receipt, the server-side appliance 604B may parse the packet to identify the header and/or the body. From the header, the server-side appliance 604B may further identify the identifier for identifying the relevant portion of the application metadata. In accordance with the portion of the application metadata, the server-side appliance 604B may select or identify a policy to apply to the packets to be streamed. In some embodiments, the policy may specify quality of service (QoS) configuration (e.g., a range for packet loss, bit rate, throughput, delay, and jitter). The QoS configuration of the policy may set a range of bandwidth used for streaming the packets between the client 102 and the server 106 for accessing the application 16'. For example, for a user typing, actively scrolling, and reading in a word processing application as indicated in the metadata, the policy may specify use of a low-latency link and forward error correction. In contrast, for a user watching a video in a browser or transferring files in an explorer, the policy may specify use of a high-bandwidth link for bulk transfer. In some embodiments, the policy may specify a set of access control rules (e.g., firewall). The policy may specify the QoS configuration or access control depending on the application metadata contained in the header of the packet.

Upon identifying the policy, the server-side appliance 604B may apply the policy to the packets to be streamed to the client 102. In applying the policy according to the portion of the application metadata, the server-side appliance 604B may determine network resources to allocate to at least one of the streams of packets. The network resources allocated to one or more of the streams of packets may include a bandwidth, a bandwidth limit, a latency range, permitted jitter, or a data transmission rate (throughput), among others. For example, the server-side appliance 604B may set the network resources to the rates indicated by the QoS specifications of the selected policy. By allocating the network resources in accordance to the policy, the server-side appliance 604B may provide the target QoS to the streams of packets between the client-side appliance 604A and the server-side appliance 604B.

The server-side appliance 604B may route the packet in a stream (1360). The server-side appliance 604B may send the packet in the stream to the client-side appliance 604A. The stream may correspond to one of the set of virtual channels established between the client-side appliance 604A and the server-side appliance 604B. In some embodiments, the server-side appliance 604B may control the routing of the packet in accordance to the network resources allocated to the stream in which the packet is to be communicated. The client-side appliance 604A may send the packet from the stream to the application 16 on the client 102 (1362). The client-side appliance 604A may receive the stream of packets from one of the set of virtual channels established between the client-side appliance 604A and the server-side appliance 604B. Upon receipt, the client-side appliance 604A may send the packet from the stream to the application 16 on the client 102 (1362).

Figure 14:
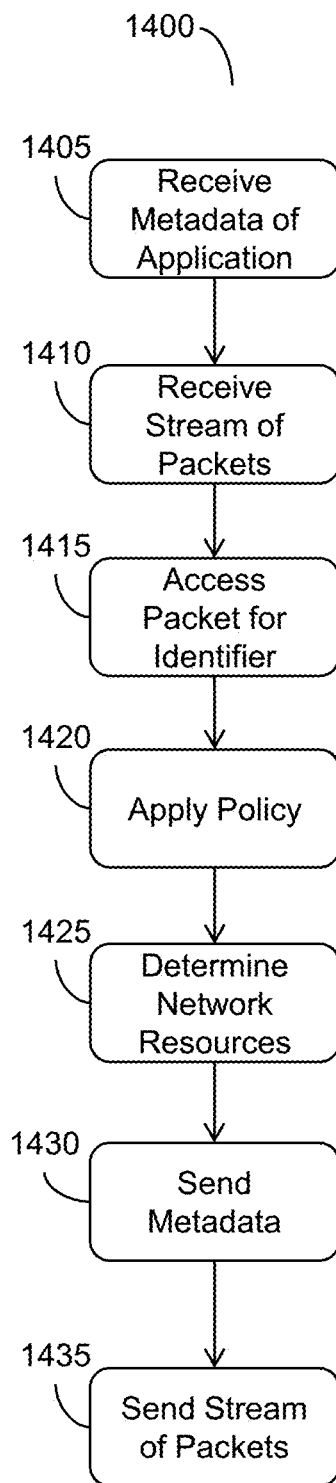
FIG. 14 is a flow diagram illustrating a method of optimizing virtual application delivery via intermediary devices, according to illustrative embodiments.

Referring now to FIG. 14, depicted is a flow diagram of a method 1400 for optimizing virtual application delivery via intermediary devices. The method 1400 may be performed using at least one client 102 executing at least one application 16 (e.g., workspace application), at least one client-side appliance 604A (e.g., client-side SD-WAN device), at least one server-side appliance 604B (e.g., server-side SD-WAN device), at least one delivery agent 504 (e.g., a VDA), and at least one server 106 hosting an application 16' (or network application), among other components as detailed herein above in Sections A-E. In brief overview, a network device may receive metadata of an application (1405). The network device may receive a stream of packets (1410). The network device may access a packet for an identifier (1415). The network device may apply a policy (1420). The network device may determine network resources (1425). The network device may send the metadata (1430). The network device may send the stream of packets (1435).

In further detail, a network device (e.g., the client-side appliance 604A or server-side appliance 604B) may receive metadata of an application (e.g., application 16' on the server 106) (1405). The application may be hosted on a server (e.g., the server 106). The application hosted on the server may be accessed by a client (e.g., the receiver 502 on the client 102) via the network device. The application may have been launched in response to a request for the application received from the client and forwarded to the server via the network device. The metadata of the application may include data or information descriptive of or related to the application, such as: an application identifier, an application type, a window or process identifier, a window hierarchy, a user element in focus, a network address, or an account identifier associated with a user of the client, among others. The metadata may also include data or information indicative of user interaction with the application or activity at the client, such as: an activation of a user interface element, an event notification, user input through an input/output (IO) device connected with the client, or a link accessed on the application, among others. In some embodiments, the network device may identify, retrieve, or receive the metadata from the application hosted on the server. The metadata may include data or information about availability of features supporting user interaction with the application or activity at the client. In some embodiments, the network device may identify, retrieve, or receive the metadata of the application from another device, such as a delivery agent (e.g., the delivery agent 504) or a cloud service among others. In some embodiments, the network device may receive the metadata from the client device executing on a local instance of the application (e.g., the application 16).

The network device may receive a stream of packets (1410). The network device may support one or more virtual channels for the application to communicate data (e.g., the stream of packets) between the client and the server. In some embodiments, the network device may receive the stream of packets via one of the virtual channels from the delivery agent. In some implementations, the receipt of the stream of packets may be separate from the receipt of the metadata of the application. For example, the stream of packets may be received via a virtual channel different from the virtual channel for the receipt of the metadata of the application. In some embodiments, the network device may identify, retrieve, or receive the stream of packets from the application hosted on the server. In some embodiments, the network device may receive the stream of packets from the client device executing on the local instance of the application.

The network device may access a packet for an identifier (1415). Packets of the stream may be generated in accordance with any number of communications protocols, such as a transport layer security (TLS) or datagram transport layer security (DTLS), among others. Packets (e.g., some or all of the packets) may have a header and a body in accordance with the communications protocol. The header may include an identifier associated with at least a portion of the metadata for the application. In some embodiments, the header of the packet may include a TLS or DTLS header with a clear-text extension. The network device may access the header of at least one of the packets in the stream to extract or identify the identifier associated with the portion of the metadata for the application. Using the identifier from at least one of the packets in the stream, the network device may identify the metadata of the application.

The network device may apply a policy (1420). The network device may identify which policy to apply using the metadata of application identified using the identifier from at least one of the packets in the stream of packets. The policy may specify a quality of service (QoS) configuration (e.g., a range for packet loss, bit rate, throughput, delay, and jitter) to be allocated. The QoS configuration may set a range of bandwidth to be used for streaming the packets between the client and the server for accessing the application. With the identification, the network device may apply the policy responsive to the identified metadata of the application.

The network device may determine network resources (1425). The network device may set or allocate the network resources to communicate the stream of packets across the virtual channel. The network resources may correspond to capacity available for the stream of packets communicated via at least one of the virtual channels may include a bandwidth, a latency range, permitted jitter, or a data transmission rate (throughput), among others. In some embodiments, the network device may determine the network resources in accordance with the identified portion of the metadata for the application. In some embodiments, by applying the policy to the identified portion of the metadata, the network device may determine a target QoS configuration for the streams of packets. The target QoS configuration may correspond to the configuration specified by the policy given the identified metadata. The target QoS configuration may set or allocate the network resources to the communication of streams of packets across the virtual channel for the application.

The network device may send the metadata (1430). The network device may forward, provide, or otherwise transmit the metadata of the application via one of the virtual channels supported and maintained by the network device. The metadata may be the same metadata (or at least portion thereof) initially received by the network device. The metadata may be transmitted by the network device to another network device (e.g., the client-side appliance 604A or the server-side appliance 604B), the client, the server, or the delivery agent. The network device may send the metadata in or through a virtual channel (or out-of-band) separate from the virtual channel communicating the streams of packets.

The network device may send the stream of packets (1435). The sending of the stream of packets by the network device may be in accordance with the determined network resource. In some embodiments, the network device may send the stream of packets via the virtual channel at the determined bandwidth, bandwidth limit, latency range, permitted jitter, or a data transmission rate in accordance with the identified portion of the metadata. The network device may forward, provide, or otherwise transmit the stream of packets via one of the virtual channels supported and maintained by the network device. The stream of packets may be transmitted by the network device to another network device (e.g., the client-side appliance 604A or the server-side appliance 604B), the client, the server, or the delivery agent. The network device may send the metadata on a virtual channel separate from the virtual channel communicating the metadata for the application.

Controlling Access to Web Content via Intermediary Devices

Figure 15:
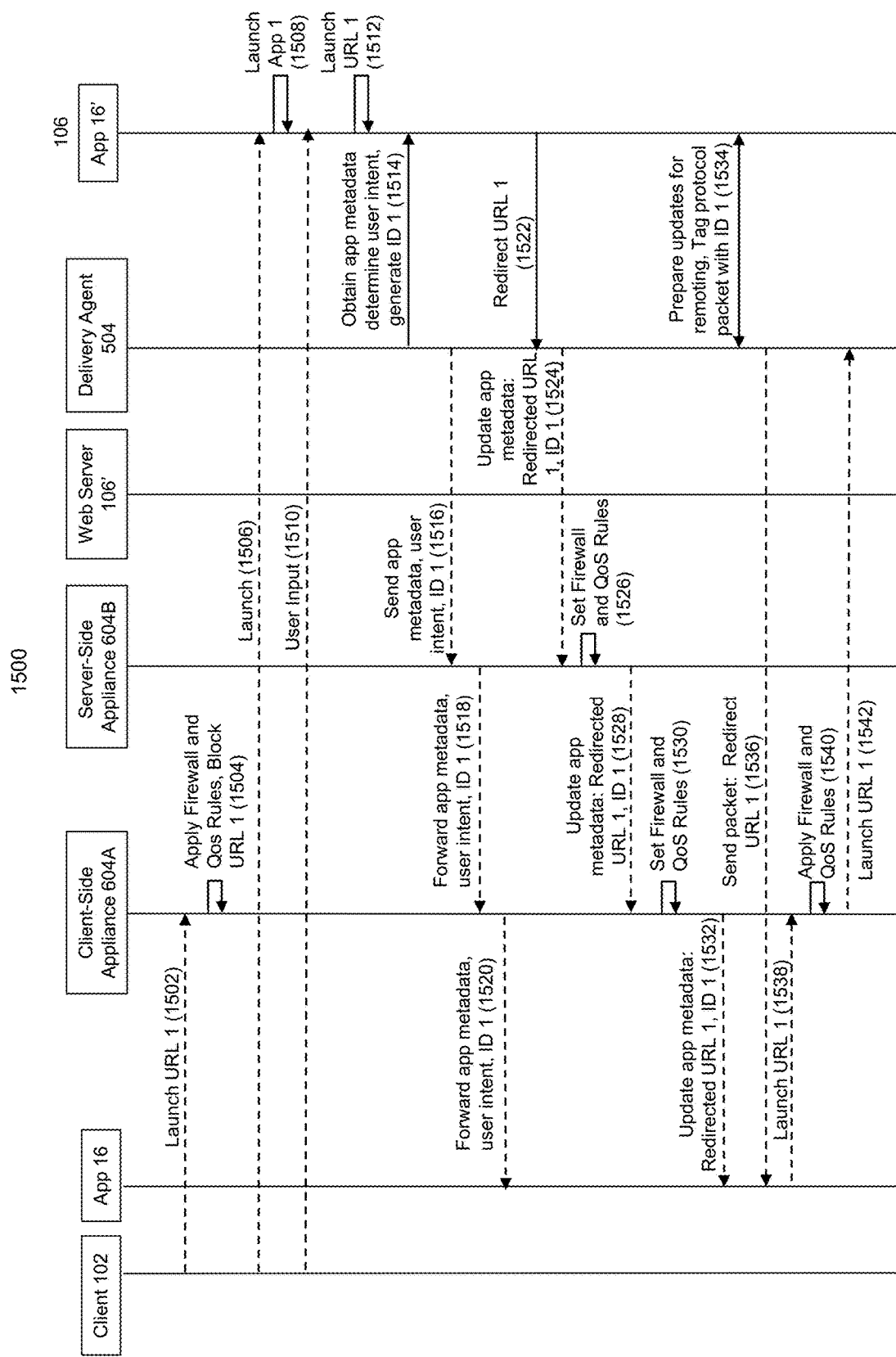
FIG. 15 is a sequence diagram illustrating a process for controlling access to redirected content, according to illustrative embodiments.

Referring now to FIG. 15, depicted is a sequence diagram illustrating a process 1500 for controlling access to redirected content. The process 1500 may be performed using at least one client 102 executing at least one application 16 (e.g., workspace application), at least one client-side appliance 604A (e.g., client-side SD-WAN device), at least one server-side appliance 604B (e.g., server-side SD-WAN device), at least one delivery agent 504 (e.g., VDA), at least one web server 106', and at least one server 106 hosting an application 16' (e.g., network application), among other components as detailed herein above in Sections A-E. For example, the client-side appliance 604A and the server-side appliance 604B may be an instance of the network device 604, and may each support a set of virtual channels for communications between the client 102 and the server 106, among others components.

In further detail, the client 102 may attempt to access web content from the web server 106' (e.g., using a uniform resource locator (URL)) (1502). The URL may include a hostname and a file pathname. The hostname may directly reference the web server 106'. The file pathname may reference a specific resource (e.g., web content) hosted on the web server 106'. The URL invoked by the client 102 may be part of a request to send to the web server 106' over the Internet. The client-side appliance 604A may apply a rule to the attempted access of the URL (1504). The rule may restrict clients 102 from directly accessing resources on the web server 106' via the client-side appliance 604A. Because the URL directly references the web server 106', the client-side appliance 604A may restrict and block the URL from launching in accordance with the policy.

Subsequently, the client 102 may launch an application 16' hosted on the server 106 (1506). The application 16' (e.g., a network application such as a virtual application, virtual desktop, SaaS application or web application) hosted on the server 106 may be accessed on the client 102 via the application 16 on the client 102. The application 16' may include a single program or a set of programs accessible via a remote desktop. The application 16 (also referred herein as a work application) may be an agent executing on the client 102 for accessing the application 16' hosted on the server 106. To launch, the application 16 running on the client 102 may generate and send a request for the application 16' hosted on the server 106. The request may include a URL. The URL of the request may include a hostname and a pathname. The hostname may reference the server 106 hosting the application 16'. The pathname may reference a resource hosted on the server 106, such as the application 16'.

In response, the server 106 may launch the application 16' (1508). The server 106 may receive the request for the application 16' from the client 102. Upon receipt of the request, the server 106 may commence execution of the application 16' to provide to the application 16 running on the client 102. In some embodiments, the server 106 may identify a previously instantiated application 16' to remotely provision to the application 16 running on the client 102. The server 106 may provide access of the application 16' to the client 102 using a set of virtual channels established between the client 102 and the server 106 through the client-side appliance 604A and the server-side appliance 604B. Each virtual channel may communicate a stream of packets between the application 16' running on the server 106 and the application 16 running on the client 102.

With access provided to the client 102, the application 16' running on the server 106 may wait for user input (1510). The user input may include one or more user interaction events with the application 16'. In some embodiments, the application 16 on client 102 may maintain and run an event listener to monitor for a user interaction event. The user interaction event may include, for example, user input through an input/output device, such as a hover over, a click, a scroll, a touch screen, a keypress. The user interaction may include an activation of a user interface element of a graphical user interface of the application 16' accessed via the application 16 on the client 102. Upon detecting the user interaction event, the application 16 running on the client 102 may send the user input to the application 16' running on the server 106. In some embodiments, the application 16 running on the client 102 may send the user input via one or more of the virtual channels between the client 102 and the server 106 to the application 16' running on the server 106.

The application 16' on the server 106 may access the resources referenced by the URL (1512). In some embodiments, the application 16' may identify the URL as corresponding to the user input received from the client 102 (e.g., on a hyperlink in a user interface element). The URL may include a hostname and a pathname. The hostname of the URL may directly or indirectly (e.g., using network address translation (NAT)) reference the web server 106'. The pathname may reference a specific resource (e.g., web content) hosted on the web server 106'.

The delivery agent 504 may provide application metadata associated with the application 16' from the server 106 (1514). The application metadata may include any information regarding the application 16' hosted on the server 106. The application metadata may include, for example: an application identifier (e.g., a published application name), an application type (e.g., a word processor, a web browser, or a media player), a window or process identifier, a window hierarchy, a user element in focus, a network address (e.g., a Uniform Resource Locator (URL) and an Internet Protocol (IP) address), an account identifier associated with the user operating the application 16 or 16', a device identifier corresponding to the client 102. The application metadata may also include interaction data indicative user interaction events with the application 16' accessed via the application 16 on the client 102. The interaction data may include, for example, an activation of a user interface element, an event notification, user input through an input/output (10) device, or a URL (e.g., a hyperlink) accessed by the user on the application 16', among others.

In some embodiments, the delivery agent 504 may obtain the application metadata from the server 106 hosting the application 16'. In some embodiments, the delivery agent 504 may reside along a data path in one or more networks between the client 102 and the server 106, and may intercept the application metadata from communications via the data path. The obtaining of the application metadata including the interaction data may be in accordance with an API (e.g., Microsoft UI Automation API) used by the application 16 and 16'. In some embodiments, the delivery agent 504 may obtain the application metadata from the client 102 accessing the application 16' via the application 16. For example, the application 16 may register event notification and request specific properties and control pattern information. In some embodiments, the delivery agent 504 may obtain the application metadata via a cloud service or another network device. The cloud service may be a cloud-based resource associated with the application 16' hosted on the server 106. In some embodiments, the delivery agent 504 may use virtual window tracking to identify the user element in focus and the window hierarchy. In some embodiments, the delivery agent 504 may use process monitoring to identify the user element and the window hierarchy. In some embodiments, the delivery agent 504 may obtain the interaction data in accordance with the API used by the application 16 and 16' to enumerate the window hierarchy and identify the user element in focus.

The delivery agent 504 may send the application metadata to the server-side appliance 604B (1516). In some embodiments, the application metadata may be sent by the delivery agent 504 indirectly to the application 16 via the server-side appliance 604B and the client side appliance 604A. Once obtained, the delivery agent 504 may provide the application metadata to the server-side appliance 604B. In some embodiments, the delivery agent 605 may send the application metadata to the server-side appliance 604B via a virtual channel (e.g., via an app flow virtual channel) separate from the set of virtual channels for communicating streams of packets for the application 16 and 16'. The separate virtual channel (sometimes referred herein as out-of-band) may be established between the server-side appliance 604B and the delivery agent 504. In some embodiments, the server-side appliance 604B may obtain the application metadata via a cloud service or another network device. The cloud service may be a cloud-based resource associated with the application 16' hosted on the server 106.

The server-side appliance 604B may forward the application metadata to the client-side appliance 604A (1518). In some embodiments, the server-side appliance 604B may send the application metadata via a virtual channel separate from the set of virtual channels for communicating streams of packets for the application 16 and 16'. The separate virtual channel (sometimes referred herein as out-of-band) may be established between the client-side appliance 604A and the server-side appliance 604B. The client-side appliance 604A may receive the application metadata. In some embodiments, the application metadata may be sent by the delivery agent 504 directly to the client-side appliance 604A via the separate virtual channel. The separate virtual channel (sometimes referred herein as out-of-band) may be established between the client-side appliance 604A and the delivery agent 504. In some embodiments, the client-side appliance 604A and the delivery agent 504 may establish the separate virtual channel via an authentication protocol. In some embodiments, the client-side appliance 604A may obtain the application metadata via a cloud service or another network device. The cloud service may be a cloud-based resource associated with the application 16' hosted on the server 106. The client-side appliance 604A may forward the application metadata to the application 16' on the client 102 (1520).

Subsequently, the application 16' running on the server 106 may send a redirect URL to the delivery agent 504 (1522). The redirect URL may be part of a redirect request (e.g., an HTTP message with a 3xx status code) specifying to the application 16 running on the client 102 to another URL indicated in the redirect URL. The redirect URL may include a hostname and a pathname. The hostname of the redirect URL may reference the web server 106'. The pathname of the redirect URL may reference the specific resource (e.g., web content) hosted on the web server 106'. The redirect URL may be generated in accordance with various redirection techniques, such as Browser Content Redirection (BCR), Multimedia Redirection with client-side fetching, and Flash redirection, among others. The redirect URL may indirectly refer to a target URL corresponding to resources hosted on the web server 106'. The target URL may, for example, correspond to a media source or a BCR target URL.

The delivery agent 504 may update the application metadata to include the redirect URL to send to the server-side appliance 604B (1524). The delivery agent 504 may receive the redirect URL from the application 16' running on the server 106. In some embodiments, the delivery agent 504 may receive the redirect request including the redirect URL from the application 16'. In some embodiments, the delivery agent 504 may replace the original URL included in the application metadata with the redirect URL from the redirect request. Upon updating, the delivery agent 504 may send the application metadata with the redirect URL to the server-side appliance 604B.

Upon receipt, the server-side appliance 604B may set a rule (1526). The rule may specify allocation of network resources for the client 102 to access resources on the web server 106' via the server-side appliance 604B. In some embodiments, the server-side appliance 604B may receive the application metadata with the redirect URL from the delivery agent 504. The server-side appliance 604B may parse the application metadata to identify the redirect URL. In accordance with the relevant portion of the application metadata (including the redirect URL), as specified via tags/identifiers, the server-side appliance 604B may select, determine, or identify a rule to apply to the packets to be streamed. In some embodiments, the rule may specify quality of service (QoS) configuration (e.g., network resources to allocate, and/or an acceptable range for packet loss, bit rate, throughput, delay, and jitter). The QoS configuration of the rule may set a range of bandwidth used for streaming the packets between the client 102 and the server 106 for accessing the application 16'. In some embodiments, the rule may specify a set of access control rules (e.g., firewall rules). The rule may specify the QoS configuration and/or access control depending on the redirect URL contained in the header of the packet.

Upon identifying the rule, the server-side appliance 604B may apply the rule to the redirect URL to be sent to the client 102. In applying the rule according to the application metadata, the server-side appliance 604B may determine network resources to allocate to accessing the resources on the web server 106'. The network resources allocated to one or more of the streams of packets may include a bandwidth, a bandwidth limit, a latency range, permitted jitter, or a data transmission rate (throughput), among others. The network resources allocated to one or more of the streams of packets may determine access control (firewall operation), e.g., to allow or deny packet traffic. For example, the server-side appliance 604B may set the network resources to the rates indicated by the QoS specifications of the selected rule. By allocating the network resources in accordance to the rule, the server-side appliance 604B may provide the target QoS to the client 102 while accessing the resources hosted on the web server 106' via the server-side appliance 604B. In addition, the server-side appliance 604B may apply the allocation of network resources to the client 102 during accessing the resources of the web server 106' via the server-side appliance 604B. With the setting of the rule, the server-side appliance 604B may send the updated application metadata with the redirect URL to the client-side appliance 604A (1528). The client-side appliance 604A may receive the updated application metadata with the redirect URL from the server-side appliance 604B.

Upon receipt, the client-side appliance 604A may set a rule (1530). The rule may specify allocation of network resources for the client 102 to access resources on the web server 106' via the client-side appliance 604A. In some embodiments, the client-side appliance 604A may receive the application metadata with the redirect URL from the delivery agent 504. The client-side appliance 604A may parse the application metadata to identify the redirect URL. In some embodiments, the rule on the client-side appliance 604A may allow access to the resources referenced by the redirect URL. In accordance with the portion of the application metadata (including the redirect URL), the client-side appliance 604A may select, determine, or identify a rule to apply to the packets to be streamed. In some embodiments, the rule may specify quality of service (QoS) configuration (e.g., a range for packet loss, bit rate, throughput, delay, and jitter). The QoS configuration of the rule may set a range of bandwidth used for streaming the packets between the client 102 and the server 106 for accessing the application 16'. In some embodiments, the rule may specify a set of access control rules (e.g., firewall rules). The rule may specify the QoS configuration and/or access control depending on the redirect URL contained in the header of the packet.

Upon identifying the rule, the client-side appliance 604A may apply the rule to the redirect URL to be sent to the client 102. In applying the rule according to the application metadata, the client-side appliance 604A may determine network resources to allocate to access the resources on the web server 106'. The network resources allocated to one or more of the streams of packets may include a bandwidth, a bandwidth limit, a latency range, permitted jitter, or a data transmission rate (throughput), among others. For example, the client-side appliance 604A may set the network resources to the rates indicated by the QoS specifications of the selected rule. By allocating the network resources in accordance to the rule, the client-side appliance 604A may provide the target QoS to the client 102 while accessing the resources hosted on the web server 106' via the client-side appliance 604A and the server-side appliance 604B. In addition, the client-side appliance 604A may apply the allocation of network resources to the client 102 during accessing the resources of the web server 106' via the client-side appliance 604A and the server-side appliance 604B. With the setting of the rule, the client-side appliance 604A may send the updated application metadata with the redirect URL to the application 16 running on the client 102 (1532).

Subsequently, the server 106 may execute an update on the application 16'. The update on the application 16' may correspond to any change on the application 16'. For example, the server 106 may execute a process of the application 16' thereby changing execution of the application 16' in response to the user input received via the application 16 from the client 102. In some embodiments, the update of the application 16' may correspond to a change to the set of instructions (e.g., software) underlying the application 16'. In some embodiments, the update of the application 16' may correspond to a change in the application metadata (e.g., addition of interaction data).

The delivery agent 504 may tag, assign, or otherwise add a packet with the application identifier (1534). In some embodiments, the delivery agent 504 may access, receive, or otherwise identify the packet to be streamed from the application 16' hosted on the server 106. The packet may be generated in accordance with any number of communications protocols, such as a transport layer security (TLS) or datagram transport layer security (DTLS), among others. The packet may correspond to a redirect request. In some embodiments, the packet may have a header and/or a body in accordance with the communications protocol for the packet. The header may include a tag or identifier for identifying at least a relevant portion of the application metadata for the application 16'. The identifier may be a set of alphanumeric characters uniquely identifying the portion of the application metadata relevant to the packet or its virtual channel. In some embodiments, the delivery agent 504 may identify the portion of the application metadata, and provide a corresponding identifier to include into the header of the packet. The delivery agent 504 may generate the identifier for the portion of the application metadata. The delivery agent 504 may insert the identifier into the header of the packet. In some embodiments, the delivery agent 504 may include the identifier into the header of a TLS or DTLS packet with a clear-text extension. In some embodiments, the delivery agent 504 may tag the packet to specify a tunneling protocol (e.g., bits in a gateway protocol header). In some embodiments, the delivery agent 504 may tag the packet a network address (e.g., a combination of IP address and port number). In some embodiments, the delivery agent 504 may tag the packet with an anonymity tag to hide identifying information (e.g., the combination of IP address and port number).

Once generated, the delivery agent 504 may send the packet with the redirect URL to the application 16 on the client 102 (1536). In some embodiments, the packet sent by the delivery agent 504 may correspond to the redirect request with the redirect URL. In some embodiments, the delivery agent 504 may send the application metadata via a virtual channel (e.g., an app flow virtual channel) separate from the set of virtual channels for communicating streams of packets for the application 16 and 16'. The separate virtual channel (sometimes referred herein as out-of-band) may be established between the client-side appliance 604A and the delivery agent 504. The client-side appliance 604A may receive the application metadata (including the redirect URL). In some embodiments, the application metadata may be sent by the delivery agent 504 directly to the client-side appliance 604A via the separate virtual channel. The separate virtual channel (sometimes referred herein as out-of-band) may be established between the client-side appliance 604A and the delivery agent 504. The out-of-band virtual channel may utilize media acceleration techniques, such as Multimedia Redirection or Flash Redirection media source URLs, Browser Content Redirection (BCR) target URLs. In some embodiments, the client-side appliance 604A and the delivery agent 504 may establish the separate virtual channel via an authentication protocol.

The application 16 running on the client 102 may attempt to access a resource referenced by the redirect URL (1538). The application 16 may directly or indirectly (e.g., via the server-side appliance 604B or the client-side appliance 604A) the packet including the redirect URL from the delivery agent 504. In some embodiments, the application 16 may parse the packet to identify the redirect URL. The redirect URL may include a hostname and a file pathname. The hostname may indirectly reference (e.g., using rewriting techniques such as network address translation (NAT)) the web server 106'. The file pathname may reference a specific resource (e.g., web content) hosted on the web server 106'. The redirect URL invoked by the client 102 may be part of a request sent to the web server 106' via the client-side appliance 600A.

The client-side appliance 604A may apply a rule to the launching of the redirect URL (1540). The rule may allow accessing the resources on the server 106' via the client-side appliance 604A. The client-side appliance 604A may permit the sending of a request comprising a packet with the redirect URL, toward the web server 106'. In sending the packet, the client-side appliance 604A may receive application metadata from the application (e.g., workspace application) running on the client 102. The application metadata may include activity (e.g., user interactions) at the client 102 with respect to the application 16' accessed via the application 16. In some embodiments, the client-side appliance may apply the firewall and QoS rules on the packet and/or on the application metadata.

For example, using the application metadata received from the client 102, the client-side appliance 604A may select, determine, or identify a rule to apply to the packets to be streamed from the web server 106' to the client 102. In some embodiments, the rule may specify quality of service (QoS) configuration (e.g., a range for packet loss, bit rate, throughput, delay, and jitter). The QoS configuration of the rule may set a range of bandwidth used for streaming the packets between the client 102 and the web server 106' for accessing the web content. In some embodiments, the rule may specify a set of access control rules (e.g., firewall rules). The rule may specify the QoS configuration or access control depending on the redirect URL contained in the header of the packet. In applying the rule, the client-side appliance 604A may determine network resources to allocate for the client 102 to access the resources on the web server 106'. The network resources allocated to one or more of the streams of packets may include a bandwidth, a bandwidth limit, a latency range, permitted jitter, or a data transmission rate (throughput), among others. For example, the client-side appliance 604A may set the network resources to the rates indicated by the QoS specifications of the selected rule. By allocating the network resources in accordance to the rule, the client-side appliance 604A may provide the target QoS to the client 102 while accessing the resources hosted on the web server 106' via the client-side appliance 604A. In addition, the client-side appliance 604A may apply or enforce the allocation of network resources to the client 102 when accessing the resources of the web server 106' via the client-side appliance 604A.

With the setting of the rule, the client-side appliance 604A may launch the redirect URL to send to the web server 106' (1542). The client-side appliance 604A may send or forward a packet from the client 102 to the web server 106' to access the resources (e.g., web content) hosted on the web server 106'. The client-side appliance 604A may also receive streams of packets from the web server 106' corresponding to the hosted resources. The streams of packets may be communicated via at least one channel established between the client-side appliance 604A and the web server 106'. The packets may include the web content and related data from the web server 106'. Upon receipt, the client-side appliance 604A may forward the packets to the application 16 running on the client 102. In forwarding the packets, the client-side appliance 604A may cause the application 16 running on the client 102 to incorporate and/or render the web content and the related data from the web server 106'. The application 16 running on the client 102 may also integrate the web content with the data of the application 16 in rendering on the client 102. For example, the application 16 may render media content on a previously loaded graphical user interface (of the application 16') displayed on the client 102.

Figure 16:
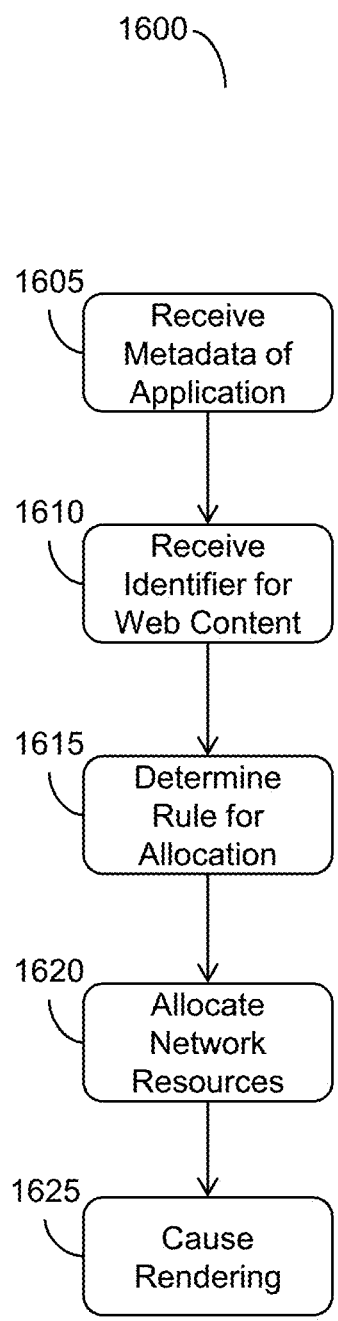
FIG. 16 is a flow diagram illustrating a method of controlling access to redirected content, according to illustrative embodiments.

Referring to FIG. 16, depicted is a flow diagram illustrating a method 1600 of controlling access to redirected content, according to illustrative embodiments. The method 1600 may be performed using at least one client 102 executing at least one application 16 (e.g., workspace application), at least one client-side appliance 604A (e.g., client-side SD-WAN device), at least one server-side appliance 604B (e.g., server-side SD-WAN device), at least one delivery agent 504 (e.g., VDA), at least one web server 106', and at least one server 106 hosting an application 16' (e.g., network application), among other components as detailed herein above in Sections A-E. In brief overview, a network device may receive metadata of an application (1605). The network device may receive an identifier (e.g., uniform resource locator (URL)) for web content (1610). The network device may determine a rule for allocation (1615). The network device may allocate network resources (1620). The network device may cause rendering (1625).

In further detail, a network device (e.g., the client-side appliance 604A or server-side appliance 604B) may receive metadata of an application (e.g., the application 16' on the server 106) (1605). The application may be hosted on a server (e.g., the server 106). The application hosted on the server may be accessed by a client (e.g., the client 102) via the network device. The application may have been launched in response to a request for the application received from a client (e.g., the client 102) and forwarded via the network device. The metadata of the application may include data or information descriptive of or related to the application, such as: an application identifier, an application type, a window or process identifier, a window hierarchy, a user element in focus, a network address, or an account identifier associated with a user of the client, among others. The metadata may also include data or information indicative of user interaction with the application or activity at the client, such as: an activation of a user interface element, an event notification, user input through an input/output (I/O) device connected with the client, or a link accessed on the application, among others. The metadata may also include data or information indicative of availability of features that support or enable user interaction with the application or activity at the client. In some embodiments, the network device may identify, retrieve, or receive the metadata from the application hosted on the server. In some embodiments, the network device may identify, retrieve, or receive the metadata of the application from another device, such as a delivery agent (e.g., the delivery agent 504) or a cloud service among others. The delivery agent may update the metadata prior to provisioning to the network device. The metadata updated by the delivery agent may be the same metadata as provided to the network device. In some embodiments, the network device may receive the metadata from the client device executing on a local instance of the application (e.g., the application 16 or a workspace application).

The network device may receive an identifier (e.g., uniform resource locator (URL)) for web content (1610). The URL may enable a client (e.g., the client 102) to access web content from a web server (e.g., the web server 106'). The web content may be accessed or requested via the application on the client device. The URL may include a hostname and a pathname. The hostname of the URL may reference the web server. The pathname of the URL may reference the specific web content hosted on the web server. The URL invoked by the client may be part of a request for content to send to the web server over the network. In some embodiments, another network device (e.g., the client-side appliance 604A or the server-side appliance 604B) may restrict clients from directly accessing web content hosted on the web server via the network. In some embodiments, the network device may receive a redirect URL as part of a redirect request from the network device restricting direct access of the web content hosted on the web server. In some embodiments, the network device may receive the metadata as part of the redirect request from the network device restricting direct access. The network device may support one or more virtual channels for the web content to communicate data (e.g., the stream of packets) between the client and the web server. The web content, the request including the URL, and the metadata for the application may be communicated via different virtual channels and received from different virtual channels.

The network device may determine a rule for allocation (1615). The rule may specify an allocation of network resources for the client in accessing the web content via the web server based on the metadata. In some embodiments, the rule may specify access controls (e.g., firewalls) to permit or restrict access to the web content hosted on the web server. In some embodiments, the rule may specify a quality of service (QoS) configuration (e.g., a range for packet loss, bit rate, throughput, delay, and jitter) to be allocated. The QoS configuration may set a range of bandwidth to be used for streaming the packets between the client and the server for accessing the application. Based on the metadata of the application, the network device may select, identify, or determine the rule to apply. For example, the network device may select a rule based on the metadata of the application matching conditions (e.g., tags or identifiers) for the rule. In some implementations, the network device may determine the rule to apply based on the activity at the client device.

The network device may allocate network resources (1620). The allocation of the network resources by the network device for accessing the web content hosted on the web server may be in accordance with the determined rule. By applying the rule, the network device may determine the allocation of the network resources for accessing the web content. For example, the network device may identify the allocation of network resources specified by the rule for the given metadata. In some embodiments, the network resources allocated in accordance with the access controls may include permission or restriction of the client device in accessing the web content. In some embodiments, the network resources allocated in accordance with the QoS configuration may include: a bandwidth, a bandwidth limit, a latency range, permitted jitter, or a data transmission rate (throughput), among others, for the web content communicated via at least one of the virtual channels. With the allocation, the network device may provide access the client device to the web content in accordance with the allocated network resources. In some embodiments, the network device may set or configure the virtual channel providing accessing to the web content according to the determined network resources for the web content.

The network device may cause rendering (1625). The network device may cause rendering of the web content and the related data of the application from the web server. In some embodiments, the network device may send the web content and the data of the application from the web server to the client device. The web content and the data of the application may be sent via one or more of the virtual channels maintained and supported by the network device. Upon receipt, the client device may present, display, or render the web content and the data of the application. In some embodiments, the network device may cause the web content to be integrated with the data of the application for rendering at the client device. In some embodiments, the client device may combine or integrate the received web content with the received data of the application for rendering.

Managing Streams of Protocol Packets Based on Network Conditions

Referring to FIG. 11 in conjunction with FIGS. 13 and 14, a network device (e.g., the client-side appliance 604A or the server-side appliance 604B) may support a set of virtual channels for communications between the client 102 and the server 106. The server 106 may execute the application 16' and the delivery agent 504. Each virtual channel may communicate a stream of packets between the application 16' running on the server 106 and the application 16 running on the client 102. In communicating the streams of packets, the network device may monitor for network conditions between the client 102 and the server 106. The network condition of each virtual channel may include a bandwidth, a link status (e.g., active or inactive), link number, (increased) loss rate, (increased) latency, jitter rate, and data transmission rate (throughput), among others. In some embodiments, the network device may measure the bandwidth, link condition, link number, loss rate, latency, jitter rate, and data transmission rate at each virtual channel.

The network device may generate, transmit and/or provide metadata to the delivery agent 504. The metadata may indicate the measured network conditions. In some embodiments, the metadata may for instance include the measured network conditions for each virtual channel established between the client 102 and the server 106. In some embodiments, the network device may send the metadata via a virtual channel separate from the set of virtual channels for communicating streams of packets for the application 16 and 16'. The separate virtual channel (sometimes referred herein as out-of-band) may be established between the network condition and the delivery agent 504. In some embodiments, the network device may send the metadata via one or more of the virtual channels for communicating streams of packets for the application 16 and 16' to the delivery agent 504 (sometimes referred herein as in-band).

With the provision of the metadata, the network device may cause or instruct the delivery agent 504 to set, change, or otherwise update a packet transmission configuration of the virtual channels established between the client 102 and the server 106. The packet transmission configuration may for instance specify which virtual channels are to be used to communicate the streams of packets between the client 102 and the server 106. In some embodiments, the packet transmission configuration may also specify the network resources to be allocated to the streams of packets communicated between the client 102 and the server 106. The updating of the packet transmission configuration may be in accordance with a policy. The policy may specify quality of service (QoS) configuration (e.g., network resources to be allocated, and/or an acceptable range for packet loss, bit rate, throughput, delay, and jitter) for the virtual channels. The QoS configuration of the policy may set or allocate bandwidth used for streaming the packets between the client 102 and the server 106 via the virtual channels. In some embodiments, the policy may specify a set of access control rules (e.g., firewall) for the virtual channels established between the client 102 and the server 106. The delivery agent 504 may apply the policy to update the packet transmission configuration.

In updating the packet transmission configuration, the delivery agent 504 may change a packet transmission mode of the virtual channels. The packet transmission mode may specify different arrangements (e.g., data transmission rate, bandwidths, and encryption) to be used in communicating the streams of packets over the virtual channels. The delivery agent 504 may change at least one virtual channel from one transmission mode to another transmission mode. For example, when the measured network conditions indicate increase in latency and/or packet loss in transmission, the delivery agent 504 may change to another transmission mode with more efficient bandwidth (and/or that is more lossy or unreliable) than the previous transmission mode. This may be advantageous to the interactivity of user experience (UX), e.g., graphics and user input into the virtual session with application 16'. The change in transmission modes for communicating streams of packets may include changing from a H.264 graphics mode to a Thinwire+ graphics mode, among others.

The delivery agent 504 may set or change an allocation of network resources to the virtual channels established between the client 102 and the server 106. Based on the metadata, the delivery agent 504 may determine network resources to allocate to at least one of the streams of packets. The network resources allocated to one or more of the streams of packets may include a bandwidth, a bandwidth limit, a latency range, permitted jitter, or a data transmission rate (throughput, via throttling for instance), among others. For example, the delivery agent 504 may set the network resources to the rates indicated by the QoS specifications of the selected policy. By allocating the network resources in accordance to the policy, the delivery agent 504 may provide the target QoS to the streams of packets between the client 102 and the server 106. In some embodiments, the delivery agent 504 may set the allocation of network resources of virtual channels by applying a bandwidth cap. The bandwidth cap may be specified by the policy, and may indicate a maximum bandwidth permitted to be used on the virtual channel (or on multiple or all virtual channels). For example, when the network conditions indicate a link failure that affects one or more virtual channels, the delivery agent 504 may reduce the bandwidth allocation to at least some of the virtual channels, or may drop one or more of the virtual channels.

In some embodiments, the delivery agent 504 may enable or disable one or more of the virtual channels established between the client 102 and the server 106 based on the metadata indicative of network conditions. For example, when the network conditions indicate a reduction in bandwidth or a link failure (e.g., in one or more of the virtual channels), the delivery agent 504 may disable a virtual channel to prevent communication of streams of packets over the virtual channel. The enabling and disabling of virtual channels may be in accordance with a list indicating a priority of virtual channels. The list may specify an order or a sequence in which to disable the virtual channels based on priority and/or importance of certain virtual channels, and/or based on measured network conditions. The delivery agent 504 may disable the virtual channels in sequence as specified by the list based on the network conditions.

Figure 17:
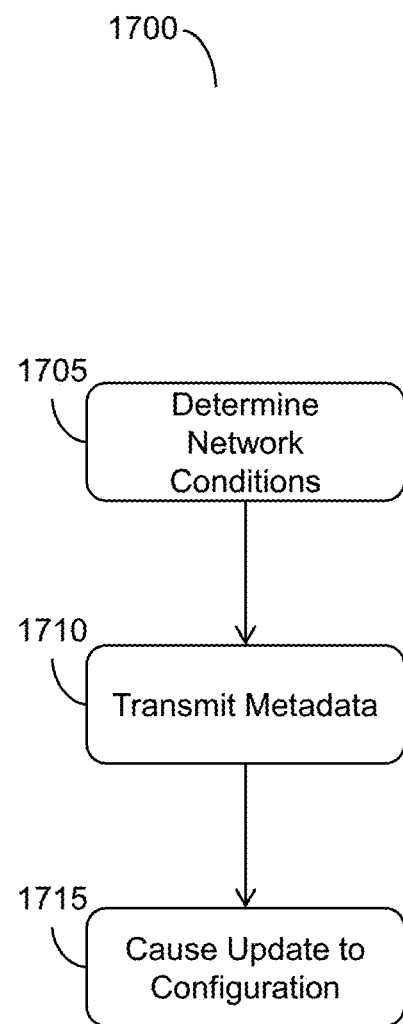
FIG. 17 is a flow diagram illustrating a method of managing streams of protocol packets based on network conditions, according to illustrative embodiments.

Referring now to FIG. 17, depicted is a flow diagram illustrating a method 1700 of managing streams of protocol packets based on network conditions. The method 1700 may be performed using at least one client 102 executing at least one application 16 (e.g., workspace application), at least one client-side appliance 604A (e.g., client-side SD-WAN device), at least one server-side appliance 604B (e.g., server-side SD-WAN device), at least one delivery agent 504 (e.g., VDA), at least one web server 106', and at least one server 106 hosting an application 16' (e.g., network application), among other components as detailed herein above in Sections A-E. In brief overview, a network device may determine network conditions (1705). The network device may transmit metadata (1710). The network device may cause an update to a configuration (1715).

In further detail, a network device (e.g., the client-side appliance 604A or the server-side appliance 604B) may determine network conditions (1705). The network device may support one or more virtual channels for the application to communicate data (e.g., the stream of packets) between the client (e.g., the client device 102) and the server (e.g., the server 106). In some embodiments, the virtual channels to communicate the data may be between the client device and an application (e.g., the application 16) on another network device (e.g., the delivery agent 504). In some embodiments, the network device may measure, monitor, or determine the network conditions in each virtual channel. For example, the network device may send a test packet (e.g., a ping) through the virtual channel and wait for a response from the virtual channel. Based on the test packet and response (and the time elapsed), the network device may determine various measures with regards to the virtual channels. The network conditions determined by the network device may include a bandwidth, a link status (e.g., active or inactive), link number, (increased/decreased) loss rate, (increased/decreased) latency, jitter rate, and data transmission rate (throughput), among others.

The network device may transmit metadata (1710). The metadata may include or indicate the determined network conditions, such as the bandwidth, link status, link number, loss rate, latency, jitter rate, and data transmission rate of each virtual channel. The metadata may be transmitted by the network device to another network device (e.g., the server 106 or the delivery agent 504). In some embodiments, the network device may generate the metadata using the determined network conditions. In some embodiments, the network device may receive the metadata of the application and update the received metadata by including the determined network conditions. In some embodiments, the network device may send the metadata via one or more of the virtual channels. In some embodiments, the metadata may be sent by the network device via a virtual channel or other means separate from the virtual channel for the stream of packets.

The network device may cause an update to a configuration (1715). By sending the metadata, the network device may cause another network device (e.g., the server 106 or the delivery agent 504) to set or change a packet transmission configuration of the virtual channels. The recipient network device may set, modify, or change the packet transmission configuration of the virtual channels in accordance with the metadata. In some embodiments, the packet transmission configuration may specify which virtual channels are to be enabled or disabled to communicate the streams of packets. The network device may disable or enable the virtual channels based on the metadata. In some embodiments, the packet transmission configuration may specify a list or priority-related order for enabling or disabling virtual channels. The network device may disable or enable virtual channels in accordance with the list or order of the configuration. In some embodiments, the configuration may also specify network resources to be allocated to the virtual channels. The network resources may include a bandwidth, a bandwidth limit, a latency range, permitted jitter, or a data transmission rate (throughput), among others, for the stream of packets communicated via at least one of the virtual channels. The network device may increase or decrease the network resources allocated to the virtual channels based on the metadata. In some embodiments, by updating the packet transmission configuration, the network device may set or change a packet transmission mode of the virtual channel. The mode of the virtual channel may include, for example, a H.264 graphics mode and a Thinwire+ graphics mode, among others.

Various elements, which are described herein in the context of one or more embodiments, may be provided separately or in any suitable sub-combination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

It will be further understood that various changes in the details, materials, and arrangements of the parts that have been described and illustrated herein may be made by those skilled in the art without departing from the scope of the following claims.

What is claimed is:

1. A method comprising:
   determining, by a network device intermediary between a client device and a server, network conditions on a plurality of virtual channels, the network device supporting the plurality of virtual channels between the client device and an application provided by a delivery agent of the server, the plurality of virtual channels to communicate streams of packets for the application;
   transmitting, by the network device to the delivery agent, metadata indicative of the determined network conditions on the plurality of virtual channels for the application; and
   causing, by the network device, the delivery agent of the server to update a packet transmission configuration to change a graphics mode for communications on at least one of the plurality of virtual channels from a first mode to a second mode that is more efficient than the first mode for the application provided by the delivery agent of the server, the update of the packet transmission configuration being in response to receipt, by the delivery agent, of the metadata from the network device, wherein the first mode includes a H.264 graphics mode and the second mode includes a Thinwire+ graphics mode.

2. The method of claim 1, wherein updating the packet transmission configuration comprises changing an allocation of network resources to apply to the plurality of virtual channels.

3. The method of claim 2, wherein the network conditions comprise a reduction in bandwidth to the plurality of virtual channels, and wherein changing the allocation of network resources includes disabling a first virtual channel from the plurality of virtual channels.

4. The method of claim 3, wherein the first virtual channel is selected from a list or priority-related order of virtual channels to disable.

5. The method of claim 2, wherein changing the allocation of network resources includes applying a bandwidth cap to at least one of the plurality of virtual channels.

6. The method of claim 2, wherein the network conditions comprise a link failure, and wherein changing the allocation of network resources includes disabling a first virtual channel from the plurality of virtual channels or reducing an allocation of bandwidth to the first virtual channel.

7. The method of claim 1, wherein the network conditions comprise an increase in at least one of latency or packet loss to the plurality of virtual channels, and wherein updating the packet transmission configuration comprises changing at least one of the plurality of virtual channels from a first transmission mode to a second transmission mode that is more lossy than the first transmission mode.

8. A network device comprising:
   at least one processor configured to:
      determine network conditions on a plurality of virtual channels, the network device supporting the plurality of virtual channels between a client device and an application provided by a delivery agent of a server, the plurality of virtual channels to communicate streams of packets for the application;
      transmit, to the delivery agent, metadata indicative of the determined network conditions on the plurality of virtual channels for the application; and
      cause the delivery agent of the server to update a packet transmission configuration to change a graphics mode for communications on at least one of the plurality of virtual channels from a first mode to a second mode that is more efficient than the first mode for the application provided by the delivery agent of the server, the update of the packet transmission configuration being in response to receipt, by the delivery agent, of the metadata from the network device, wherein the first mode includes a H.264 graphics mode and the second mode includes a Thinwire+ graphics mode.

9. The network device of claim 8, wherein updating the packet transmission configuration comprises changing an allocation of network resources to apply to the plurality of virtual channels.

10. The network device of claim 9, wherein the network conditions comprise a reduction in bandwidth to the plurality of virtual channels, wherein changing the allocation of network resources includes disabling a first virtual channel from the plurality of virtual channels, and wherein the first virtual channel is selected from a list or priority-related order of virtual channels to disable.

11. The network device of claim 9, wherein changing the allocation of network resources includes applying a bandwidth cap to at least one of the plurality of virtual channels.

12. The network device of claim 9, wherein the network conditions comprise a link failure, and wherein changing the allocation of network resources includes disabling a first virtual channel from the plurality of virtual channels or reducing an allocation of bandwidth to the first virtual channel.

13. A non-transitory computer readable medium storing program instructions for causing one or more processors to:
   determine network conditions on each of a plurality of virtual channels, the network device supporting the plurality of virtual channels between a client device and an application provided by a delivery agent of a server, the plurality of virtual channels to communicate streams of packets for the application;

transmit, to the delivery agent, metadata indicative of the determined network conditions on the plurality of virtual channels for the application; and cause the delivery agent of the server to update a packet transmission configuration to change a graphics mode for communications on at least one of the plurality of virtual channels from a first mode to a second mode that is more efficient than the first mode for the application provided by the delivery agent of the server, the update of the packet transmission configuration being in response to receipt, by the delivery agent, of the metadata from the network device, wherein the first mode includes a H.264 graphics mode and the second mode includes a Thinwire+ graphics mode.

14. The non-transitory computer readable medium of claim 13, wherein updating the packet transmission configuration comprises changing an allocation of network resources to apply to the plurality of virtual channels.

15. The method of claim 1, wherein a packet communicated via at least one of the plurality of virtual channels is tagged with the metadata.

16. The method of claim 1, wherein the delivery agent is configured to update the packet transmission configuration in accordance with a quality of service (QoS) configuration for the plurality of virtual channels for the application.

* * * * *